(12) United States Patent
Yokoyama et al.

(10) Patent No.: US 8,614,348 B2
(45) Date of Patent: Dec. 24, 2013

(54) DIAMANTANE COMPOUNDS, LIQUID CRYSTALLINE COMPOUNDS, AND LIQUID CRYSTALLINE COMPOSITIONS

(75) Inventors: Yasushi Yokoyama, Kanagawa (JP); Tsuyoshi Gushiken, Kanagawa (JP); Takashi Ubukata, Kanagawa (JP)

(73) Assignees: National University Corporation YOKOHAMA National University, Kanagawa (JP); JX Nippon Oil & Energy Corporation, Tokyo (JP)

( * ) Notice: Subject to any disclaimer, the term of this patent is extended or adjusted under 35 U.S.C. 154(b) by 509 days.

(21) Appl. No.: 12/922,285

(22) PCT Filed: Mar. 11, 2008

(86) PCT No.: PCT/JP2008/054342
§ 371 (c)(1),
(2), (4) Date: Oct. 8, 2010

(87) PCT Pub. No.: WO2009/113155
PCT Pub. Date: Sep. 17, 2009

(65) Prior Publication Data
US 2011/0015426 A1     Jan. 20, 2011

(51) Int. Cl.
*C07C 69/76*    (2006.01)
(52) U.S. Cl.
USPC .......................................................... 560/76
(58) Field of Classification Search
None
See application file for complete search history.

(56) References Cited

U.S. PATENT DOCUMENTS 5,347,063 A     9/1994  Shen et al.

OTHER PUBLICATIONS

Chern et al. (J. Polymer Science, Part A: Polymer Chemistry, 1998, 36(5), 785).*
JP Office Action dated May 8, 2013, Application No. 2010-502659.
Yaw-Terng Chern and Hann-Chyan Shiue, High Subglass Transition Temperatures and Low Dielectric Constants of Polyimides Derived from 4,9-Bis (4-aminophenyl) diamantane; Institute of Chemical Engineering, National Taiwan University of Science and Technology, Taipei, 106, Taiwan; Chemistry of Materials (1998), 10(1), 210-216.
Yaw-Terng Chern and Hann-Chyan Shiue, Low Dielectric Constants of Soluble Polyimides Derived from the Novel 4,9-Bis [4-(4-aminophenoxy)phenyl] diamantane; Institute of Chemical Engineering, National Taiwan University of Science and Technology, Taipei, 106, Taiwan; Macromolecules (1997), 30(19), 5766-5772.

* cited by examiner

*Primary Examiner* — Johann R Richter
*Assistant Examiner* — Jennifer C Sawyer
(74) *Attorney, Agent, or Firm* — Young & Thompson

(57) ABSTRACT

A liquid crystalline compound has excellent liquid crystal properties, particularly high phase transition temperature. Diamantane compounds are represented by the general formula (I): (I) wherein A and B are each a six-membered, saturated or unsaturated, carbo- or hetero-cycle, and these cycles may have substituents, which substituents may be united to form a ring; and R1 and R2 are each a hydrocarbon group having 1 to 18 carbon atoms, and part of the carbon atoms of the hydrocarbon group may be replaced by heteroatoms or heteroatom-containing groups, while part of the hydrogen atoms thereof may be replaced by halogen atoms or heteroatom-containing groups.

12 Claims, 1 Drawing Sheet

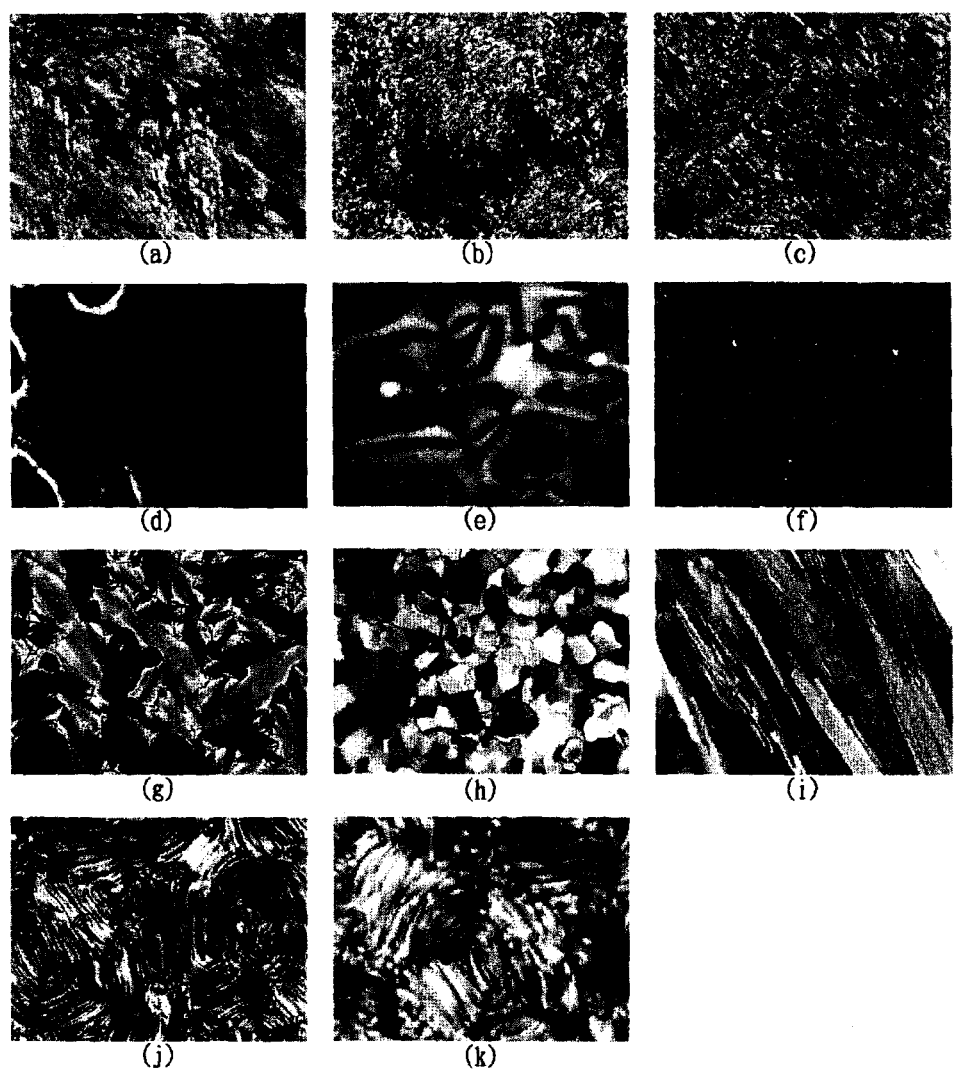

8,614,348 B2

DIAMANTANE COMPOUNDS, LIQUID CRYSTALLINE COMPOUNDS, AND LIQUID CRYSTALLINE COMPOSITIONS

TECHNICAL FIELD

The present invention relates to a novel diamantane compound and a liquid crystalline compound comprising the same, as well as to a liquid crystalline composition comprising the liquid crystalline compound.

BACKGROUND ART

Liquid crystal display devices are used not only typically for watches and calculators but also for various measuring instruments, automobile panels, word processors, electronic notebooks, printers, computers, televisions and others. Liquid crystal display devices utilize optical anisotropy and dielectric anisotropy of the liquid crystal material.

Typical liquid crystal display modes include a TN (twisted nematic) mode, an STN (super-twisted nematic) mode, a DS (dynamic scattering) mode, a GH (guest-host) mode, an FLC (ferroelectric liquid crystal) mode and the like; and as for the driving mode, multiplex driving has become more popular than conventional static driving, and further a simple matrix mode and recently an active matrix mode have become put into practical use.

In accordance with these display modes and driving modes, liquid crystal materials are required to have various properties, and a very large number of liquid crystalline compounds have been heretofore synthesized for satisfying those properties.

The properties required of liquid crystalline compounds may somewhat change according to display modes; however, a broad liquid crystal temperature range and stability to moisture, air, light, heat, electric field and the like are commonly required for any of those display modes.

At present, no single liquid crystalline compound capable of satisfying the requirements by itself is known, and some different types of liquid crystalline compounds are mixed or are further mixed with any other non-liquid crystalline compound for practical use. Mixing a plurality of compounds inevitably lowers the melting point or the like of the resulting mixture. Accordingly, liquid crystalline compounds capable of solely having a high phase transition temperature are desired in order that their mixture could still keep a practicable phase transition temperature even though the phase transition temperature are lowered by mixing them.

Liquid crystals can be divided into two major categories, one including thermotropic liquid crystals and the other including lyotropic liquid crystals. Of thermotropic liquid crystals, calamitic liquid crystals consisting of a rod-shaped molecule are being intensively studied in conjunction with electronic technology.

The calamitic liquid crystal phase includes a nematic liquid crystal phase, a smectic liquid crystal phase and a cholesteric liquid crystal phase. The cholesteric liquid crystal phase is a phase that appears when a nematic liquid crystal has an asymmetric factor or when a chiral additive (chiral dopant) is added to a nematic liquid crystal. In general, a liquid crystalline substance shows a phase change from a crystal or solid to a smectic phase and further to a nematic phase with elevation of the temperature thereof, and with further temperature elevation, it becomes an isotropic liquid. In the nematic liquid crystal phase, the molecules are aligned regularly in some degree, but there is no regularity with respect to the relative moleculargeometry. The individual molecules of nematic liquid crystals can freely move in the long axis direction thereof, and therefore have the advantage of low viscosity. The free energy of the nematic liquid crystal phase is the same irrespective of the alignment direction of the molecules, and therefore the molecular orientation can be changed in a given direction by an electric field or orientation treatment or the like given thereto, and accordingly, nematic liquid crystal molecules are widely used in liquid crystal displays and others.

Therefore, it is desirable that the lowermost limit of the temperature range within which a liquid crystal can have a nematic phase, namely, the temperature at which a liquid crystal changes from a crystal or solid state or a smectic phase to a nematic phase is low; and it is also desirable that the temperature at which a liquid crystal changes from a nematic phase to an isotropic liquid (nematic-isotropic transition temperature: $T_{NI}$—generally this is referred to as a "clearing point") (hereinafter, referred to as "N-I transition temperature") is high and that the temperature range within which a liquid crystal shows a nematic phase is broad.

Some liquid crystalline compounds having a high clearing point have been heretofore reported. Patent Reference 1 describes a compound having a skeleton where a trans-1-sila-1,4-cyclohexylene or trans-4-sila-1,4-cyclohexylene group and a trans-1,4-cyclohexylene group linked to each other are bonded to a benzene ring via a carbonyloxy group, reporting its N-I transition temperature of from 50° C. to 171° C.

Patent Reference 2 shows that a tricyclic azine such as 1-(4-methylbenzylidene)-2-[4-(trans-4-propyl)cyclohexyl-benzylidene]hydrazine or the like has an N-I transition temperature of from 227° C. to 265° C., reporting that, when mixed with a host liquid crystal having an N-I transition temperature of 116.7° C., the compound could elevate the N-I transition temperature of the mixture up to 144° C. to 157° C.

Further, Non-Patent Reference 1 reports that a 1-(4-cyanophenyl)-4-alkyl-substituted bicyclo[2,2,2]octane shows an N-I transition temperature of from 90 to 100° C.

Patent Reference 1: JP-A-8-119975
Patent Reference 2: JP-A-11-71338
Non-Patent Reference 1: G. W. Gray et al., J. Chem. Soc. Perkin II, 4765 (1981)

DISCLOSURE OF THE INVENTION

Problems that the Invention is to Solve

The present inventors have heretofore made assiduous studies of diamond compounds. A diamond compound is a cage-shaped hydrocarbon having a diamond skeleton. Diamond compounds are known to exist in crude oil. Of diamond compounds, adamantane is the smallest. From adamantane, synthesized are diamantane, a fused dimer of adamantane; triamantane, a fused trimer of adamantane; and one of tetramantanes, a fused tetramer of adamantane.

Diamond compounds have many useful properties, and their typical properties include excellent rigidity, durability, thermal stability; a diversity of three-dimensional geometric structures; chirality; negative affinity to an electron; chemical inertness; and others.

Diamond compounds and their derivatives, having the above-mentioned properties, are being studied in a broad range of applications such as nano-scale electronic machine systems, drug design, field emitters and others. Adamantane and its derivatives have already been utilized for synthesis of chemicals, zeolite catalysts, highly heat-resistant polymers and the like.

Considering that situation, it is meaningful to find out use applications of diamantane and higher-order diamond compounds utilizing their properties.

As described above, introduction of various structures into a molecule has been tried for obtaining a compound that exhibits liquid crystallinity at a high temperature. However, it cannot be said that a sufficient result has been obtained.

Accordingly, an object of the present invention is to provide a liquid crystalline compound having excellent liquid crystallinity, especially having a high phase transition temperature.

Means for Solving the Problems

The present inventors have focused attention on the symmetric structure of diamantane, and have hit on possibility that when a functional group is introduced into the structure then the compound could exhibit liquid crystallinity and could form a liquid crystal phase excellent in thermal stability owing to the rigid skeleton thereof; and based on this idea, the inventors have further energetically promoted synthesis and evaluation thereof to find that the resulting compounds exhibit liquid crystallinity much more excellent than expected; and on the basis of this finding, the inventors have completed the present invention.

The present invention provides a diamantane compound represented by a general formula (I):

[Formula 1]

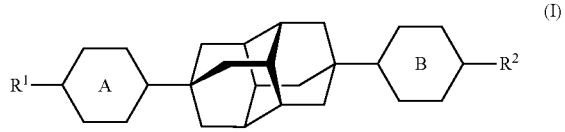

(In the general formula (I), the ring A and the ring B are each a 6-membered, saturated or unsaturated carbocycle or heterocycle. These rings may have, as a substituent, an optionally substituted hydrocarbon group, a halogen atom or a heteroatom-containing group, and the substituent may be linked together to form a ring. $R^1$ and $R^2$ are each a linear, branched, aromatic or alicyclic hydrocarbon group having from 1 to 18 carbon atoms. A part of the carbon atoms of the hydrocarbon group represented by $R^1$ and $R^2$ may be replaced by a heteroatom or a heteroatom-containing group, while a part of the hydrogen atoms thereof may be replaced by a halogen atom or a heteroatom-containing group.)

Preferably, the diamantane compound of the invention is one represented by a general formula (II):

[Formula 2]

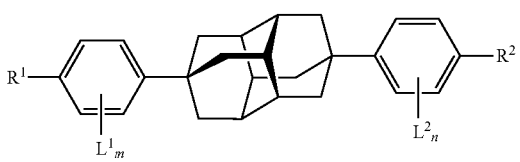

(In the general formula (II), $R^1$ and $R^2$ are the same as those in the general formula (I). $L^1$ and $L^2$ are each a hydrogen atom, an optionally substituted hydrocarbon group, a halogen atom, or a heteroatom-containing group. m and n are each an integer of from 1 to 4.)

Preferably, the diamantane compound of the general formula (II) is a diamantane compound represented by a general formula (III):

[Formula 3]

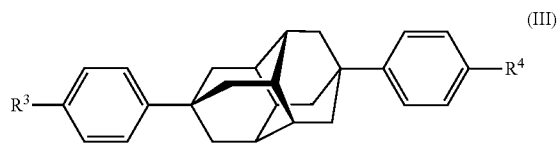

(In the general formula (III), $R^3$ and $R^4$ are each an alkyl group having from 1 to 12 carbon atoms, an alkoxy group having from 1 to 12 carbon atoms, an alkynyl group having from 1 to 12 carbon atoms, an alkoxycarbonyl group having from 1 to 12 carbon atoms, or an alkyloyloxy group having from 1 to 12 carbon atoms; and a part of the hydrogen atoms of these groups may be replaced by a halogen atom or a heteroatom-containing group.)

In the invention, the diamantane compound of the general formula (III) is preferably a diamantane compound represented by a general formula (IV):

[Formula 4]

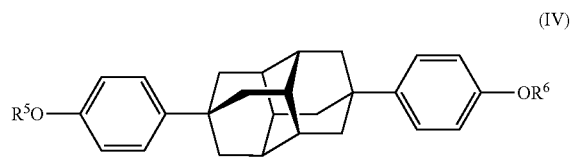

(In the general formula (IV), $R^5$ and $R^6$ are each an unsubstituted alkyl group having from 1 to 10 carbon atoms.)

In the invention, the diamantane compound of the general formula (III) is also preferably a diamantane compound represented by a general formula (V):

[Formula 5]

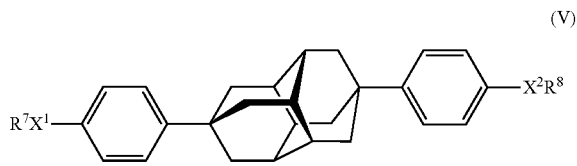

(In the general formula (V), $R^7$ and $R^8$ are each an unsubstituted n-pentyl group; and $X^1$ and $X^2$ are each —$CH_2CH_2$—, —CC— or —COO—.)

According to the invention, there is also provided a liquid crystalline compound of the diamantane compound represented by the above-mentioned general formula (I).

According to the invention, there is also provided a liquid crystalline composition comprising the above-mentioned liquid crystalline compound.

Further according to the invention, there is provided a liquid crystal display device comprising the above-mentioned liquid crystalline composition.

Advantage of the Invention

The diamantane compound of the invention is a novel compound that is easy to synthesize and has excellent thermal stability, and, as compared with conventional liquid crystal materials, the compound exhibits liquid crystallinity at far higher temperatures. Accordingly, either singly or as a liquid crystalline composition thereof with any other liquid crystalline compound, the compound is expected to have applications for liquid crystal materials serviceable even at high temperatures, for example, for in-vehicle displays and the like.

BRIEF DESCRIPTION OF THE DRAWING

FIG. 1 This shows the optical textures of 4,9-bis{4-(1-heptynyl)phenyl}diamantane observed with a polarization microscope in a heating and cooling process thereof. (a) 83.9° C. (heating process) (rubbed substrate), (b) 186.3° C. (heating process) (rubbed substrate), (c) 218.9° C. (heating process) (rubbed substrate), (d) 238.0° C. (heating process) (rubbed substrate), (e) 292.4° C. (heating process) (rubbed substrate), (f) 255.6° C. (cooling process) (rubbed substrate), (g) 233.8° C. (cooling process) (rubbed substrate), (h) 195.9° C. (cooling process) (rubbed substrate), (i) 195.9° C. (cooling process) (rubbed substrate), (j) 134.3° C. (cooling process) (rubbed substrate), (k) 24.2° C. (cooling process) (rubbed substrate).

BEST MODE FOR CARRYING OUT THE INVENTION

The diamantane compound of the invention is represented by a general formula (I):

[Formula 6]

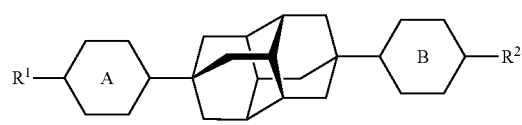

(I)

In the general formula (I), the rings A and B are each a 6-membered, saturated or unsaturated carbocycle or heterocycle. These cycles may have, as a substituent, an optionally substituted hydrocarbon group, a halogen atom or a heteroatom-containing group, and the substituent may be linked together to form a ring.

$R^1$ and $R^2$ are each a linear, branched, aromatic or alicyclic hydrocarbon group having from 1 to 18 carbon atoms. A part of the carbon atoms of the hydrocarbon group represented by $R^1$ and $R^2$ may be replaced by a heteroatom or a heteroatom-containing group, while a part of the hydrogen atoms thereof may be replaced by a halogen atom or a heteroatom-containing group.

In the invention, the heteroatom is a concept that includes the atoms belonging to Group 15 and Group 16 of the Periodic Table and also the atoms belonging to Group 14 of the Periodic Table.

Specific examples of the heteroatom include a nitrogen atom, a phosphorus atom and an arsenic atom belonging to Group 15 of the Periodic Table, an oxygen atom, a sulfur atom and a selenium atom belonging to Group 16, as well as a silicon atom and a germanium atom belonging to Group 14.

Specific examples of the heteroatom-containing group include an oxygen atom-containing group such as a hydroxy group, a carbonyl group, a formyl group, an acyl group, a carbonyloxy group, a carboxy group, an alkoxycarbonyl group, an aryloxycarbonyl group or an acyloxy group; a nitrogen atom-containing group such as an amino group, a nitrile group, an amide group, an imide group or a nitrogen atom-containing heterocyclic group (pyridyl group or the like); a sulfur atom-containing group such as a thiol group, a sulfonyl group or a sulfonic acid group; a silicon atom-containing group such as a silyl group, a silanol group or a siloxy group; and the like.

Examples of the halogen atom include a fluorine atom, a chlorine atom, a bromine atom and an iodine atom.

The diamantane compound represented by the general formula (I) of the invention is preferably one represented by a general formula (II):

[Formula 7]

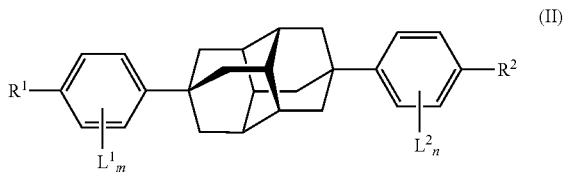

(II)

In the general formula (II), $R^1$ and $R^2$ are the same as those in the general formula (I).

$L^1$ and $L^2$ are each a hydrogen atom, an optionally substituted hydrocarbon group, a halogen atom, or a heteroatom-containing group. In case where $L^1$ or $L^2$ is a hydrocarbon group, the substituent that the group may have is a halogen atom or a heteroatom-containing group.

Specific examples of the halogen atom and the heteroatom-containing group are as described above.

m and n are each an integer of from 1 to 4.

The diamantane compound represented by the general formula (II) of the invention is preferably one represented by a general formula (III):

[Formula 8]

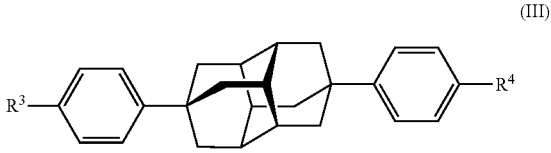

(III)

In the general formula (III), $R^3$ and $R^4$ are each an alkyl group having from 1 to 12 carbon atoms, an alkoxy group having from 1 to 12 carbon atoms, an alkynyl group having from 1 to 12 carbon atoms, an alkoxycarbonyl group having from 1 to 12 carbon atoms, or an alkyloyloxy group having from 1 to 12 carbon atoms, an aryl group having from 6 to 18 carbon atoms, or an aryloxy group having from 6 to 18 carbon atoms; and a part of the hydrogen atoms of these groups may be replaced by a halogen atom or a heteroatom-containing group.

The alkyl group having from 1 to 12 carbon atoms may be linear, branched or alicyclic. In particular, when the alkyl group is linear, the compound exhibits excellent liquid crystallinity as its interaction with the adjacent molecules may increase owing to a straightly extending rigid structure.

The alkoxy group having from 1 to 12 carbon atoms is an alkoxy group having the above-mentioned alkyl group.

The alkynyl group having from 1 to 12 carbon atoms is not specifically limited. The position of the carbon-carbon triple bond is not specifically limited. The compound in which the alkynyl group is directly connected to the benzene ring is easy to synthesize and is preferred from the viewpoint of the rigidity of the molecule.

The alkoxycarbonyl group having from 1 to 12 carbon atoms is not specifically limited.

The alkyloyloxy group having from 1 to 12 carbon atoms is not also specifically limited.

The aryl group having from 6 to 18 carbon atoms and the aryloxy group having from 6 to 18 carbon atoms are not also specifically limited.

When $R^3$ and $R^4$ are branched and have an asymmetric carbon atom at the branched site, then the compound may be a cholesteric liquid crystal or a ferroelectric liquid crystal.

Of the diamantane compounds represented by the above-mentioned general formula (III), an especially preferred one is a diamantane compound represented by a general formula (IV):

[Formula 9]

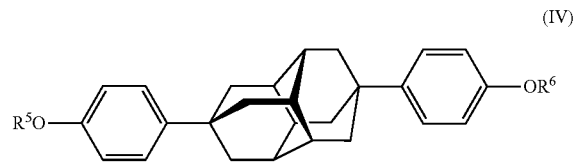

(IV)

In the general formula (IV), $R^5$ and $R^6$ are each an unsubstituted alkyl group having from 1 to 10 carbon atoms.

Specific examples of the alkyl group represented by $R^5$ and $R^6$ include a methyl group, an ethyl group, an n-propyl group, an n-butyl group, an n-pentyl group, an n-hexyl group, an n-heptyl group, an n-octyl group, an n-nonyl group, an n-decyl group, an isopropyl group, an isobutyl group, an isoamyl group, an isodecyl group, an 2-ethylhexyl group and the like. $R^5$ and $R^6$ may be the same or different.

A diamantane compound of the general formula (IV): 4,9-bis(4-alkoxyphenyl)diamantane can be synthesized by a synthesis route represented by a formula (S1a) (in case where $R^5$ and $R^6$ are each a methyl group or an ethyl group), or a formula (S1b) (in case where $R^5$ and $R^6$ are each an n-propyl group, an n-butyl group, an n-pentyl group, an n-hexyl group, an n-octyl group or an n-decyl group). In the formulae, R is an alkyl group.

Synthesis of [4,9-bis(4-alkoxyphenyl)diamantane] (Part 1)

A compound 2 is obtained through a reaction of diamantane 1 and benzene. The compound 2 is iodinated with bis(trifluoroacetoxy)iodobenzene to give a compound 3. In this reaction, the benzene ring is selectively iodinated at the 4-position owing to the steric hindrance of the bulky diamantane. The details of the synthesis step of the compound 3 are disclosed in U.S. Pat. No. 5,347,063.

Next, in a mixed solvent of methanol/benzene/dimethylformamide (hereinafter "DMF"), the compound 3 is methanolyzed with a catalyst, copper(I) iodide to give a compound 4 where R=methyl group: 4,9-bis(4-methoxyphenyl)diamantane.

Similarly, using ethanol in place of methanol, a compound 4 where R=ethyl group: 4,9-bis(4-ethoxyphenyl)diamantane is synthesized.

[Formula 10]

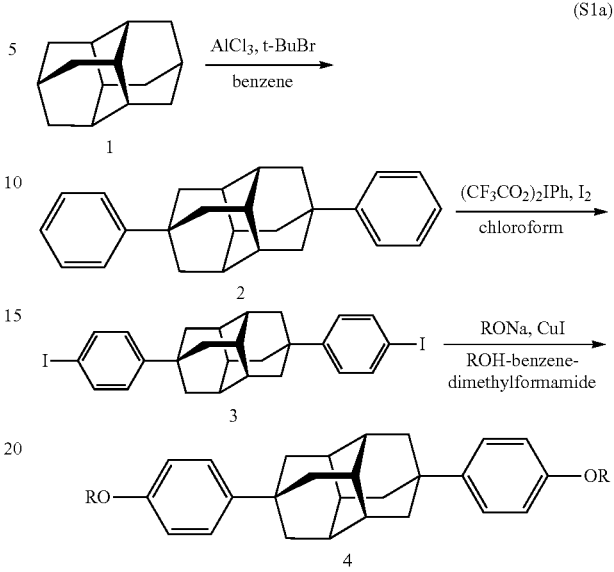

Synthesis of [4,9-bis(4-alkoxyphenyl)diamantane] (Part 2)

A coupling reaction of the compound 3 and n-propanol using copper(I) iodide, 1,10-phenanthroline and cesium carbonate gives a compound 4 where R=n-propyl group: 4,9-bis(4-propyloxyphenyl)diamantane.

N-butanol, n-pentanol, n-hexanol, n-octanol or n-decanol is used in place of n-propanol to give the corresponding compound 4.

[Formula 11]

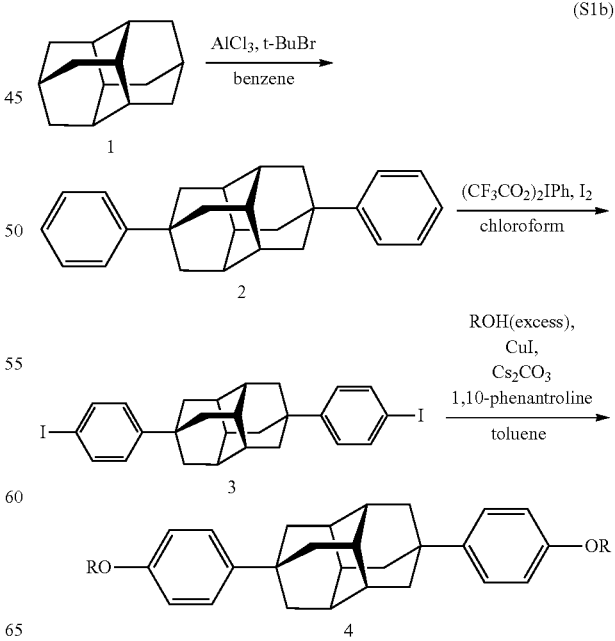

Of the diamantane compounds of the general formula (III), other especially preferred examples include a diamantane compound represented by a general formula (V):

[Formula 12]

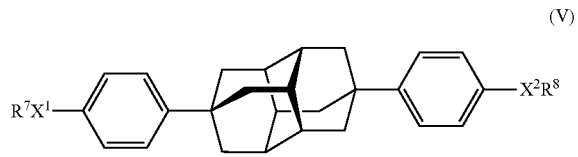

In the general formula (V), $R^7$ and $R^8$ are each an unsubstituted n-pentyl group; and $X^1$ and $X^2$ are each —$CH_2CH_2$—, —C≡C— or —COO—.

$R^7$ and $R^8$, and $X^1$ and $X^2$ may be each the same or different.

Specific examples of the diamantane compound of this type include 4,9-bis{4-(1-heptynyl)phenyl}diamantane, a diamantane compound (Va) of the general formula (V) where $X^1$ and $X^2$ are each —C≡C— and $R^7$ and $R^8$ are each an unsubstituted n-pentyl group; 4,9-bis(4-heptylphenyl)diamantane, a diamantane compound (Vb) of the general formula (V) where $X^1$ and $X^2$ are each —$CH_2CH_2$— and $R^7$ and $R^8$ are each an unsubstituted n-pentyl group; 4,9-bis(4-pentyloxycarbonylphenyl)diamantane, a diamantane compound (Vc) of the general formula (V) where $X^1$ and $X^2$ are each —COO— (provided that the carbonyl group is connected to the phenyl group) and $R^7$ and $R^8$ are each an unsubstituted n-pentyl group; and 4,9-bis(4-hexanoyloxyphenyl)diamantane, a diamantane compound (Vd) of the general formula (V) where $X^1$ and $X^2$ are each —COO— (provided that the carbonyl group is connected to the n-pentyl group) and $R^7$ and $R^8$ are each an unsubstituted n-pentyl group.

These diamantane compounds can be synthesized through the synthesis routes represented by formulae (S2) to (S5), respectively.

Synthesis of Compound (Va):
4,9-bis{4-(1-heptynyl)phenyl}diamantane

[Formula 13]

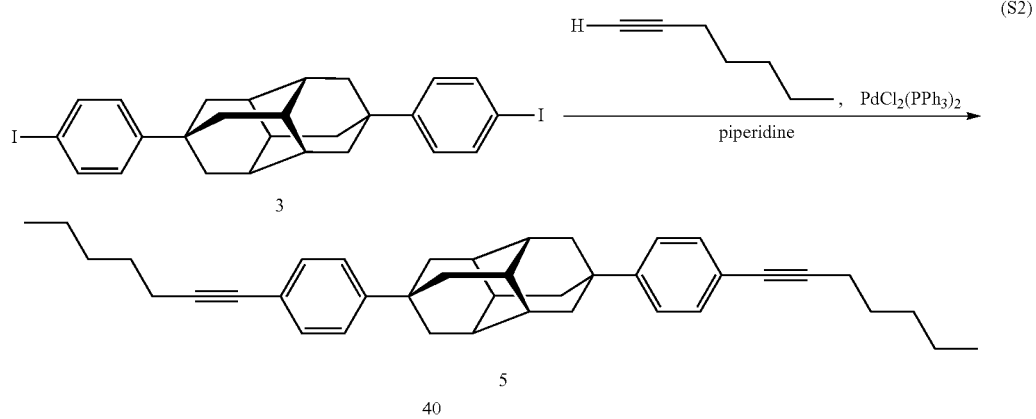

Synthesis of Compound (Vb):
4,9-bis(4-heptylphenyl)diamantane

[Formula 14]

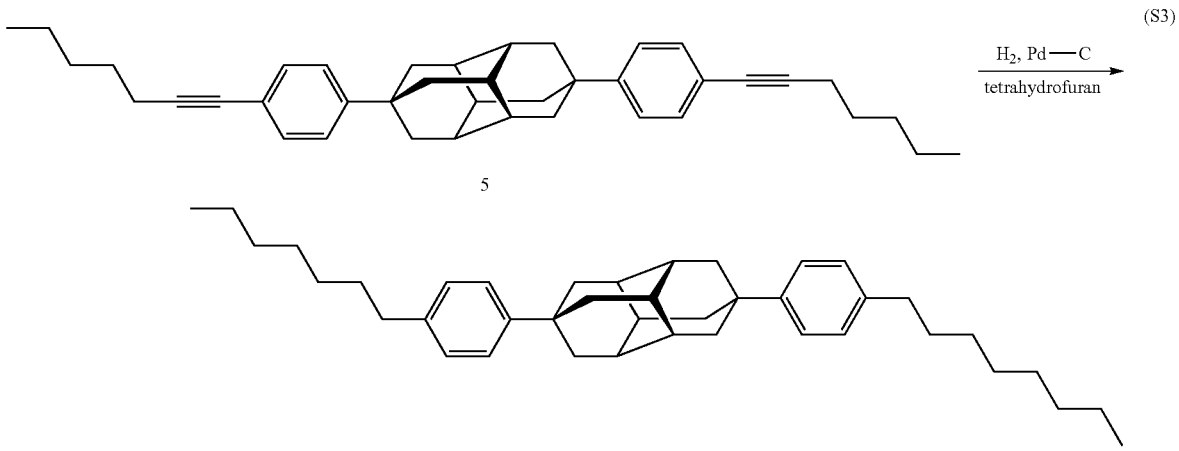

Synthesis of Compound (Vc):
4,9-bis(4-pentyloxycarbonylphenyl)diamantane
[Formula 15]
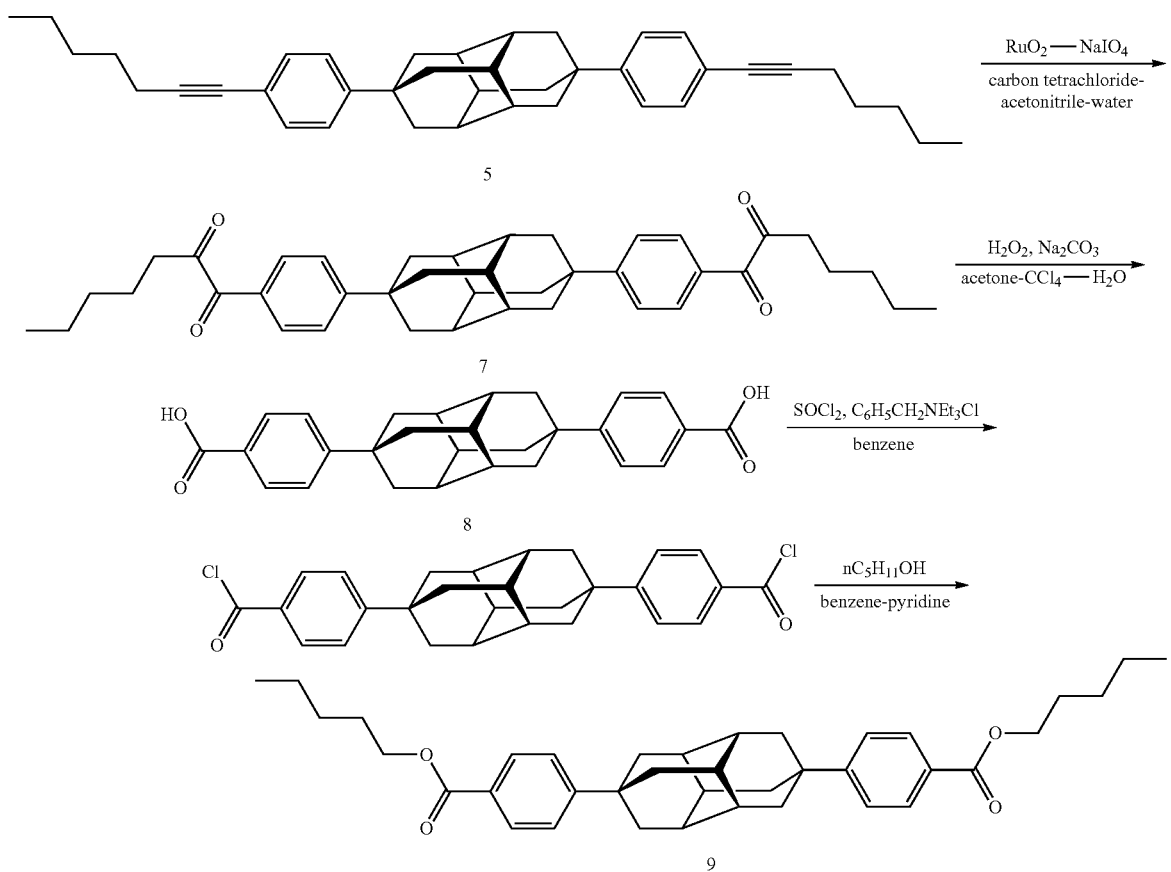
Synthesis of Compound (Vd):
4,9-bis(4-hexanoyloxyphenyl)diamantane
[Formula 16]
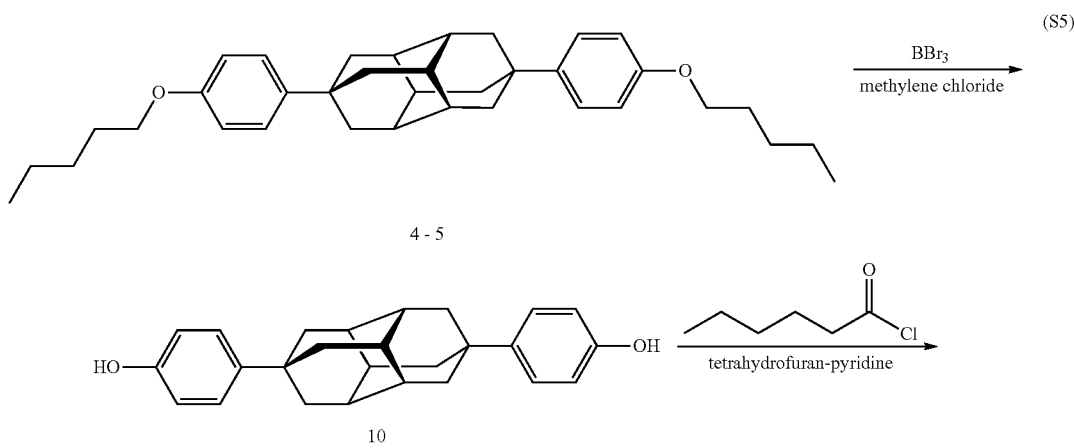

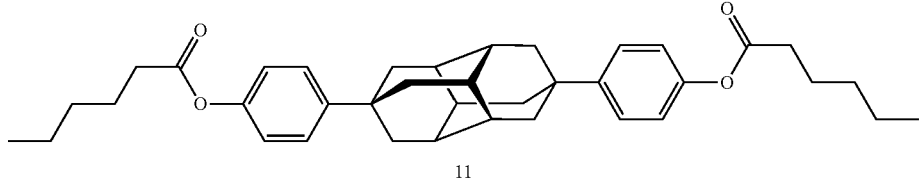

11

The diamantane compound of the invention is of course usable as a starting material for synthesis of ordinary organic compounds, but is excellent as a liquid crystalline compound.

The diamantane compound of the general formulae (IV) or (V) is especially useful as a liquid crystalline compound.

The liquid crystalline compound comprising the diamantane compound of the invention can be mixed with any other liquid crystalline compound to give a liquid crystalline composition.

The proportion of the liquid crystalline compound comprising the diamantane compound of the invention in the liquid crystalline composition is not specifically limited, and may be suitably selected in consideration of the properties of the other liquid crystalline compound to be combined, and a viscosity, a working temperature, the use and the like of the composition.

The liquid crystalline composition of the invention may contain an additive for changing the properties of the liquid crystal phase such as dielectric anisotropy and viscosity thereof, a dichroic dye, or an additive (chiral dopant) for inducing a cholesteric phase and the like.

The liquid crystalline composition of the invention may be encapsulated between transparent substrates each having an electrode of a desired shape to give a liquid crystal display device. The liquid crystal display device may have, if desired, various undercoats, overcoats for alignment control, polarizing plates, filters, reflection layers and others. The device may be formed into a multilayer cell, or may be combined with any other display device, or in the device, a semiconductor substrate may be used or a light source may be used.

The drive mode for the liquid crystal display device may be any ordinary mode known in the technical field of liquid crystal display devices, including a twisted nematic (TN) mode, a super-twisted nematic (STN) mode, a guest-host (GH) mode, a dynamic scattering (DS) mode, an electric field-controlled birefringence (ECB) mode, a vertical alignment (VA) mode, an in-plane switching (IPS) mode and others.

EXAMPLES

The invention is described more concretely with reference to Synthesis Examples and Examples given below.

The structure of the compound was confirmed through proton nuclear magnetic resonance spectrum ($^1$H NMR), mass spectrum (MS) and IR absorption spectrum (IR).

The condition of proton nuclear magnetic resonance spectrometry was as follows: Using Bruker's "DRX300", the sample was analyzed relative to a standard TMS in CDCl$_3$ or CD$_3$C(=O)CD$_3$ at 300 MHz. The signal site is shown by δ/ppm.

For the IR absorption spectrometry, used was JASCO's "FT/IR-4100". A neat sample was analyzed through a diamond prism in a mode of attenuated total reflection measurement. The absorption site is shown by wave number (cm$^{-1}$).

For the low resolution mass spectrometry, used was JEOL's "JMS-AX-600" in a mode of EI ionization. The data of relative intensity are shown.

The phase transition temperature was determined using a combined system of a polarization microscope (OLYMPUS' "PXP50") equipped with a temperature control stage (METTLER's "FP82HT"), and a differential scanning calorimeter (DSC) (Seiko Instruments' "SDC6100").

For differential calorimetry, from 1 to 4 mg of a sample was analyzed in a nitrogen atmosphere. The temperature scanning speed was from 10 to 15° C./min both in the heating process and in the cooling process.

The melting point was measured with a micro melting point apparatus, Yazawa Scientific's "BY-2".

For polarization microscopy, a liquid crystal sample was sandwiched between rubbing alignment-treated substrates, or between well-washed glass substrates, and analyzed through observation with a polarization microscope. A sample in a crystal state was once heated up to an isotropic phase temperature (a decomposable sample was heated up to a liquid crystal phase temperature where the sample was flowable), then the substrates were well rubbed so as to make the glass well wetted with the liquid crystal, and thereafter the sample was again cooled and checked during the heating process from the crystal phase (some samples from the glass phase). After the sample was changed to an isotropic liquid, cooling thereof was started, and the sample in the cooling process was observed. If desired, the temperature was kept constant, and the optical texture change in the liquid crystal phase of the sample was observed.

Example 1

Synthesis of 4,9-bis(4-methoxyphenyl)diamantane (Compound (4-1))

Step 1: Synthesis of 4,9-diphenyldiamantane (Compound 2)

[Formula 17]

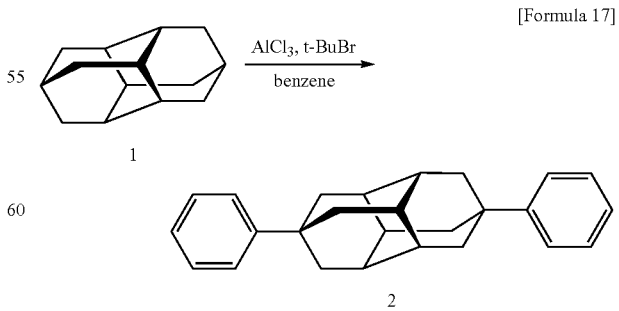

Diamantane (compound 1) (3.10 g, 16.48 mmol, 1.0 eq.), aluminum chloride (207.1 mg, 1.55 mmol, 0.1 eq.) and a spinner were put into a 300-ml three-necked eggplant flask, then a reflux condenser, a balloon and a trap containing an aqueous saturated sodium hydrogencarbonate solution were fitted thereto, and the system was purged with nitrogen. The system was cooled to 0° C., and benzene (35.5 ml) was added thereto through a syringe, and stirred. To this was added t-butyl bromide (5.4 ml, 48.1 mmol, 2.9 eq.), and then this was stirred for 1 hour while restoring it to room temperature. The reaction was quenched with an aqueous 0.5 mol/L hydrochloric acid, and then the formed white powder was collected through filtration to give a powdery crystal (4.01 g) of 4,9-diphenyldiamantane (compound 2). On the other hand, the filtrate was washed with saturated saline water and dried over anhydrous sodium sulfate. After the desiccant agent was removed through filtration and the solvent was evaporated away under reduced pressure, hexane was added to the residue, and the precipitated white solid was collected through filtration and purified by flash column chromatography (developing solvent: 20% chloroform/hexane→40% chloroform/hexane) to give a powder crystal (0.29 g) of 4,9-diphenyldiamantane (compound 2).

Amount obtained: 4.30 g (12.6 mmol)
Chemical Yield: 76.6% (based on diamantane.)
$^1$H NMR: 1.98 (18H, s), 7.19 (2H, tt, J/Hz=7.2, 1.6), 7.34 (4H, t, J/Hz=7.6), 7.42 (4H, dt, J/Hz=8.4, 1.2)
IR: 3079 (w), 3052 (w), 3014 (w), 2914 (s), 2888 (s), 2849 (s), 1600 (w), 1492 (m), 1461 (w), 1441 (w), 1378 (w), 1350 (w), 1316 (w), 1271 (w), 1248 (w), 1157 (w), 1067 (w), 1049 (w), 1031 (w), 1001 (w), 987 (w), 966 (w), 906 (w), 761 (s), 699 (s), 682 (w), 530 (m).
LRMS: 342 ((M+2)$^+$, 4.1), 341 ((M+1)$^+$, 28.6), 340 (M$^+$, 100), 263 ((M-C$_6$H$_5$)$^+$, 3.6).
Melting Point: 264.5-265.0° C.

Step 2: Synthesis of
4,9-bis(4-iodophenyl)diamantane (Compound 3)

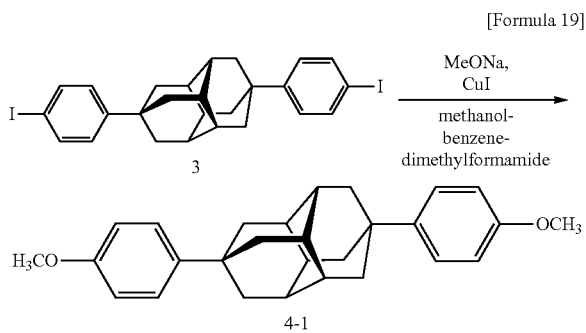

[Formula 18]

4,9-Diphenyldiamantane (compound 2) (2.14 g, 6.29 mmol, 1.0 eq.), iodine (1.815 g, 7.15 mmol), bis(trifluoroacetoxy)iodobenzene (5.808 g, 13.0 mmol, 2.1 eq.), and a spinner were put into a 100-ml two-necked eggplant flask, and chloroform (42 ml) was added thereto. The mixture was stirred at room temperature for 30 minutes. The mixture was transferred into a 500-ml beaker containing 200 ml of distilled water therein, and stirred. Dithionite was added thereto until the mixture lost its violet color, and then the aqueous layer was extracted three times with chloroform. The collected organic layer was washed with water and saturated saline water, then the solvent was evaporated away under reduced pressure, and hexane was added to the residue. The formed white powder was collected through filtration to give 4,9-bis(4-iodophenyl)diamantane (compound 3).

Amount obtained: 2.92 g (4.93 mmol)
Chemical Yield: 74.2% (based on the compound 2.)
$^1$H NMR: 1.92 (12H, bs), 1.96 (4H, bs), 1.97 (4H, bs), 7.15 (4H, d (AA'BB'), J/Hz=8.7), 7.64 (4H, d (AA'BB'), J/Hz=8.7)
IR: 2911 (s), 2874 (s), 2849 (s), 1488 (m), 1461 (w), 1437 (w), 1391 (m), 1243 (w), 1108 (w), 1073 (m), 1048 (m), 1003 (m), 984 (m), 893 (w), 821 (s), 796 (m), 760 (w), 716 (w), 699 (w), 526 (s).
LRMS: 593 ((M+1)$^+$, 59.1), 592 (M$^+$, 100), 466 ((M-I)$^+$, 54.2), 389 ((M-C$_6$H$_5$I)$^+$, 7.4).
Melting Point: >360° C. (immeasurable as it exceeded the detection limit of the melting point measuring apparatus.)

Step 3: Synthesis of
4,9-bis(4-methoxyphenyl)diamantane (Compound (4-1))

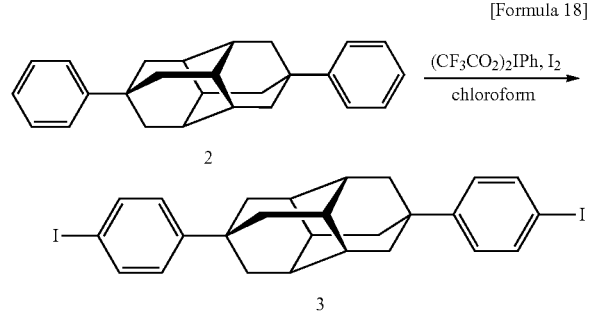

[Formula 19]

4,9-Bis(4-iodophenyl)diamantane (compound 3) (198.9 mg, 0.336 mmol) and a spinner were put into a 100-ml two-necked eggplant flask, and the system was purged with nitrogen. Benzene (8.0 ml), 4.9 mol/L sodium methoxide/methanol solution (12.0 ml, 58.8 mmol, 175 eq.) and DMF (2 ml) were added thereto, and refluxed. When the system began to reflux, copper(I) iodide (31.2 mg, 0.164 mmol, 0.43 eq.) was added thereto, and refluxed for 8.5 hours. This was left as such until the system could reach room temperature, then water and ethyl acetate were added thereto, and this was extracted three times with a mixed solvent of ethyl acetate/benzene=9/1. The collected organic layer was washed with water and saturated saline water, and dried over anhydrous sodium sulfate. The desiccant agent was removed through filtration, the solvent was evaporated away under reduced pressure, and the residue was purified through flash column chromatography (developing solvent: 100% chloroform→50% chloroform/ethyl acetate), and the resulting white powder (53.1 mg) was recrystallized from chloroform to give a white acicular crystal of 4,9-bis(4-methoxyphenyl)diamantane (compound (4-1)).

Amount obtained: 42.9 mg (0.107 mmol)
Chemical Yield: 31.9% (based on compound 3.)
$^1$H NMR: 1.93 (18H, br. s), 3.80 (6H, s), 6.88 (4H, d (AA'BB'), J/Hz=8.9), 7.33 (4H, d (AA'BB'), J/Hz=8.2)
IR: 3031 (w), 3004 (w), 2953 (w), 2911 (s), 2875 (s), 2851 (m), 1606 (m), 1509 (s), 1463 (m), 1437 (m), 1301 (m), 1250 (s), 1181 (s), 1115 (w), 1076 (w), 1047 (w), 1033 (m), 984 (s), 825 (s), 795 (m), 671 (w), 653 (w), 582 (m), 540 (s).
LRMS: 401 ((M+1)$^+$, 53), 400 (M$^+$, 100).

Example 2

Synthesis of 4,9-bis(4-ethoxyphenyl)diamantane (Compound (4-2))

[Formula 20]

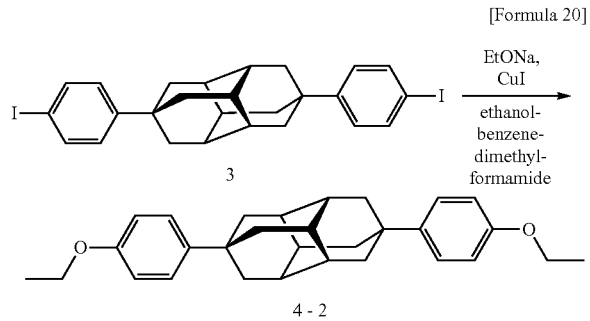

4,9-Bis(4-iodophenyl)diamantane (compound 3) (200.9 mg, 0.339 mmol, 1.0 eq.), sodium hydride (2.30 g, 57.5 mmol, 168 eq.), and a spinner were put into a 50-ml two-necked eggplant flask, and the system was purged with nitrogen. Ethanol (17 ml) was added thereto, vigorously stirred, and benzene (5.0 ml) and DMF (2.0 ml) were added thereto and refluxed. When the system began to reflux, copper(I) iodide (31.7 mg, 0.166 mmol, 0.49 eq.) was added thereto, and refluxed for 20.5 hours. This was left as such until the system could reach room temperature, then 3 mol/L hydrochloric acid was added thereto, and this was extracted three times with chloroform. The collected organic layer was washed with water and saturated saline water, and dried over anhydrous sodium sulfate. The desiccant agent was removed through filtration, the solvent was evaporated away under reduced pressure, and the residue was purified through flash column chromatography (developing solvent: 80% chloroform/hexane) to give a white powder (21.9 mg). The powder was recrystallized from chloroform to give a white acicular crystal of 4,9-bis(4-ethoxyphenyl)diamantane (compound (4-2)).

Amount obtained: 15.3 mg (0.0357 mmol)
Chemical Yield: 10.4% (based on compound 3.)
$^1$H NMR: 1.41 (6H, t, J/Hz=7.0), 4.03 (4H, q, J/Hz=7.1), 1.93 (18H, br. s), 4.03 (4H, q, J/Hz=7.1), 6.87 (4H, d (AA'BB'), J/Hz=9.0), 7.32 (4H, d (AA'BB'), J/Hz=9.0)
IR: 3081 (w), 3031 (w), 2952 (m), 2914 (m), 2882 (m), 2848 (m), 1509 (m), 1458 (m), 1439 (m), 1404 (w), 1349 (w), 1302 (w), 1286 (w), 1269 (w), 1253 (w), 1114 (w), 1075 (m), 1049 (m), 1017 (w), 985 (m), 965 (w), 830 (s), 798 (m), 727 (w), 551 (s).
LRMS: 429 ((M+1)$^+$, 57), 428 (M$^+$, 100), 400 ((M-C$_2$H$_2$)$^+$, 6), 186 ((M-C$_8$H$_9$O)$^+$, 9).

Example 3

Synthesis of 4,9-bis(4-propyloxyphenyl)diamantane (Compound 4-3))

[Formula 21]

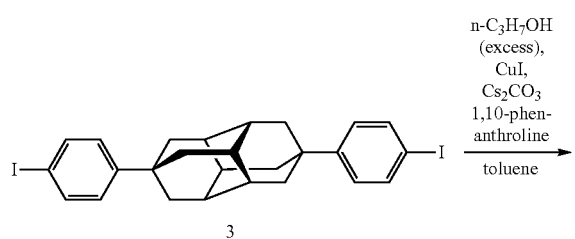

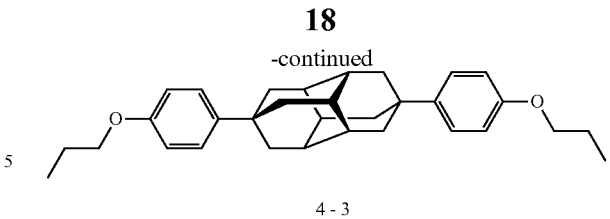

4,9-Bis(4-iodophenyl)diamantane (compound 3) (199.8 mg, 0.337 mmol, 1.0 eq.), copper(I) iodide (29.1 mg, 0.153 mmol, 0.45 eq.), 1,10-phenanthroline (anhydrous) (24.3 mg, 0.135 mmol, 0.4 eq.), cesium carbonate (449.1 mg, 1.38 mmol, 4.1 eq.), and a spinner were put into a 30-ml two-necked eggplant flask. To this were added 1-propanol (0.5 ml, 6.72 mmol, 19.9 eq.) and toluene (2.0 ml) through a syringe, and the mixture was refluxed for 38 hours with vigorously stirring. After the reaction, the suspension was cooled to room temperature, chloroform was added thereto, and the ingredient insoluble in chloroform was separated through filtration, the solvent was evaporated away under reduced pressure, and the residue was purified through flash column chromatography (developing solvent: 30% chloroform/hexane) to give a white powder (98.5 mg). The white powder was recrystallized from a mixed solvent of chloroform/hexane to give a white flaky crystal of 4,9-bis(4-propyloxyphenyl)diamantane (compound (4-3)).

Amount obtained: 67.9 mg (0.149 mmol)
Chemical Yield: 44.1% (based on compound 3.)
$^1$H NMR: 1.03 (6H, t, J/Hz=7.4), 1.80 (4H, sextet, J/Hz=7.1), 1.93 (18H, br. s), 3.91 (4H, t, J/Hz=6.5), 6.87 (4H, d (AA'BB'), J/Hz=9.0), 7.32 (4H, d (AA'BB'), J/Hz=9.0)
IR: 3033 (w), 2910 (s), 2870 (s), 1607 (m), 1510 (s), 1465 (m), 1439 (w), 1378 (w), 1299 (m), 1252 (s), 1179 (s), 1119 (w), 1074 (w), 1039 (m), 1012 (w), 974 (w), 826 (m), 795 (m), 753 (w), 618 (m), 540 (m).
LRMS: 457 ((M+1)$^+$, 60), 456 ((M$^+$, 100), 414 ((M-C$_3$H$_6$)$^+$, 12), 372 ((M-C$_6$H$_{12}$)$^+$, 25), 186 ((M-C$_{12}$H$_{22}$O$_2$)$^+$, 18).

Examples 4 to 8

Synthesis of 4,9-bis(4-butyloxyphenyl)diamantane to 4,9-bis(4-decyloxyphenyl)diamantane (Compounds (4-4) to (4-8))

Example 4

Synthesis of 4,9-bis(4-butyloxyphenyl)diamantane (Compound (4-4))

An acicular crystal of 4,9-bis(4-butyloxyphenyl)diamantane (compound (4-4)) was obtained in the same manner as in Example 3 except that 1-butanol was used.

Amount obtained: 105.8 mg (0.218 mmol)
Chemical Yield: 64.0% (based on compound 3.)
$^1$H NMR: 0.97 (6H, t, J/Hz=7.4), 1.42-1.54 (4H, m), 1.71-1.81 (4H, m), 1.93 (18H, br. s), 3.95 (4H, t, J/Hz=6.5), 6.87 (4H, d (AA'BB'), J/Hz=8.9), 7.32 (4H, d (AA'BB'), J/Hz=8.9)
IR: 3033 (w), 2910 (s), 2871 (s), 1607 (m), 1465 (s), 1378 (m), 1299 (w), 1252 (s), 1179 (m), 1119 (w), 1074 (m), 1039 (w), 1012 (m), 974 (m), 826 (m), 795 (m), 757 (w), 618 (w), 540 (m)
LRMS: 485 ((M+1)$^+$, 59), 484 ((M$^+$, 100), 428 ((M-C$_4$H$_4$)$^+$, 12), 372 ((M-C$_8$H$_8$)$^+$, 25), 186 ((M-C$_{20}$H$_{26}$O$_2$)$^+$, 18).

Example 5

Synthesis of 4,9-bis(4-pentyloxyphenyl)diamantane (Compound (4-5))

An acicular crystal of 4,9-bis(4-pentyloxyphenyl)diamantane (compound (4-5)) was obtained in the same manner as in Example 3 except that 1-pentanol was used.
Amount obtained: 129.1 mg (0.199 mmol)
Chemical Yield: 61.2% (based on compound 3.)
$^1$H NMR: 0.93 (6H, t, J/Hz=7.1), 1.31-1.49 (8H, m), 1.77 (4H, quintet, J/Hz=6.6), 1.93 (18H, br. s), 3.94 (4H, t, J/Hz=6.5), 6.87 (4H, d (AA'BB'), J/Hz=8.9), 7.32 (4H, d (AA'BB'), J/Hz=8.9)
IR: 3046 (w), 3030 (w), 2952 (m), 2931 (s), 2907 (s), 2885 (s), 2867 (s), 1607 (m), 1577 (w), 1510 (s), 1474 (m), 1440 (w), 1394 (w), 1377 (w), 1351 (w), 1299 (w), 1252 (s), 1239 (s), 1184 (s), 1119 (w), 1051 (m), 1028 (m), 984 (w), 835 (m), 798 (w), 729 (w), 620 (m), 542 (m).
LRMS: 513 ((M+1)$^+$, 62), 512 ((M$^+$, 100), 442 ((M-C$_5$H$_{10}$)$^+$, 14), 372 ((M-C$_{10}$H$_{20}$)$^+$, 36), 186 ((M-C$_{22}$H$_{30}$O$_2$)$^+$, 13).

Example 6

Synthesis of 4,9-bis(4-hexyloxyphenyl)diamantane (Compound (4-6))

A white acicular crystal of 4,9-bis(4-hexyloxyphenyl)diamantane (compound (4-6)) was obtained in the same manner as in Example 3 except that 1-hexanol was used.
Amount obtained: 99.3 mg (0.184 mmol)
Chemical Yield: 65.5% (based on compound 3.)
$^1$H NMR: 0.90 (6H, t, J/Hz=6.9), 1.30-1.35 (8H, m), 1.41-1.47 (4H, m), 1.77 (4H, quintet, J/Hz=6.8), 1.93 (18H, br. s), 3.94 (4H, t, J/Hz=6.5), 6.87 (4H, d (AA'BB'), J/Hz=8.9), 7.32 (4H, d (AA'BB'), J/Hz=8.9)
IR: 3033 (w), 2916 (s), 2879 (s), 2850 (s), 1607 (m), 1577 (w), 1509 (s), 1467 (m), 1393 (w), 1297 (w), 1250 (s), 1180 (s), 1118 (w), 1048 (w), 983 (w), 825 (s), 795 (m), 727 (w), 619 (w), 540 (m).
LRMS: 542 ((M+1)$^+$, 62), 541 ((M$^+$, 100), 456 ((M-C$_6$H$_{12}$)$^+$, 14), 372 ((M-C$_{12}$H$_{24}$)$^+$, 36), 186 ((M-C$_{24}$H$_{34}$O$_2$)$^+$, 10).

Example 7

Synthesis of 4,9-bis(4-octyloxyphenyl)diamantane (Compound (4-7))

A white acicular crystal of 4,9-bis(4-octyloxyphenyl)diamantane (compound (4-7)) was obtained in the same manner as in Example 3 except that 1-octanol was used.
Amount obtained: 104.4 mg (0.175 mmol)
Chemical Yield: 50.8% (based on compound 3.)
$^1$H NMR: 0.89 (6H, t, J/Hz=7.4), 1.29-1.48 (20H, m), 1.77 (4H, quintet, J/Hz=6.4), 1.93 (18H, br. s), 3.94 (4H, t, J/Hz=6.5), 6.87 (4H, d (AA'BB'), J/Hz=9.0), 7.31 (4H, d (AA'BB'), J/Hz=9.0)
IR: 3041 (w), 2952 (m), 2918 (s), 2887 (s), 2848 (s), 1608 (m), 1577 (w), 1475 (m), 1439 (w), 1392 (w), 1306 (m), 1294 (m), 1251 (s), 1240 (s), 1181 (s), 1117 (m), 1047 (s), 1025 (s), 1014 (m), 1003 (w), 984 (w), 828 (s), 796 (m), 757 (w), 725 (m), 541 (s).
LRMS: 598 ((M+1)$^+$, 73), 597 ((M$^+$, 100), 484 ((M-C$_8$H$_8$)$^+$, 14), 372 ((M-C$_{16}$H$_{16}$)$^+$, 33), 186 ((M-C$_{28}$H$_{42}$O$_2$)$^+$, 7.5).

Example 8

Synthesis of 4,9-bis(4-decyloxyphenyl)diamantane (Compound (4-8))

A white acicular crystal of 4,9-bis(4-decyloxyphenyl)diamantane (compound (4-8)) was obtained in the same manner as in Example 3 except that 1-decanol was used.
Amount obtained: 119.5 mg (0.183 mmol)
Chemical Yield: 51.4% (based on compound 3.)
$^1$H NMR: 0.88 (6H, t, J/Hz=6.0), 1.27-1.48 (28H, m), 1.77 (4H, quintet, J/Hz=6.8), 1.93 (18H, br. s), 3.94 (4H, t, J/Hz=6.5), 6.87 (4H, d (AA'BB'), J/Hz=9.0), 7.31 (4H, d (AA'BB'), J/Hz=9.0)
IR: 3057 (w), 2953 (m), 2919 (s), 2885 (s), 2870 (s), 2850 (s), 1611 (m), 1578 (w), 1510 (s), 1469 (m), 1439 (w), 1390 (w), 1301 (m), 1254 (s), 1236 (s), 1180 (s), 1114 (w), 1031 (m), 985 (w), 835 (m), 796 (m), 723 (w), 621 (w), 542 (m).
LRMS: 655 ((M+2)$^+$, 46), 654 ((M+1)$^+$, 62), 653 ((M$^+$, 100), 513 ((M-C$_{10}$H$_{20}$)$^+$, 19), 372 ((M-C$_{10}$H$_{20}$)$^+$, 40).

Comparative Example 1

Synthesis of 1,3-bis(4-hexyloxyphenyl)adamantane (Compound 4C)

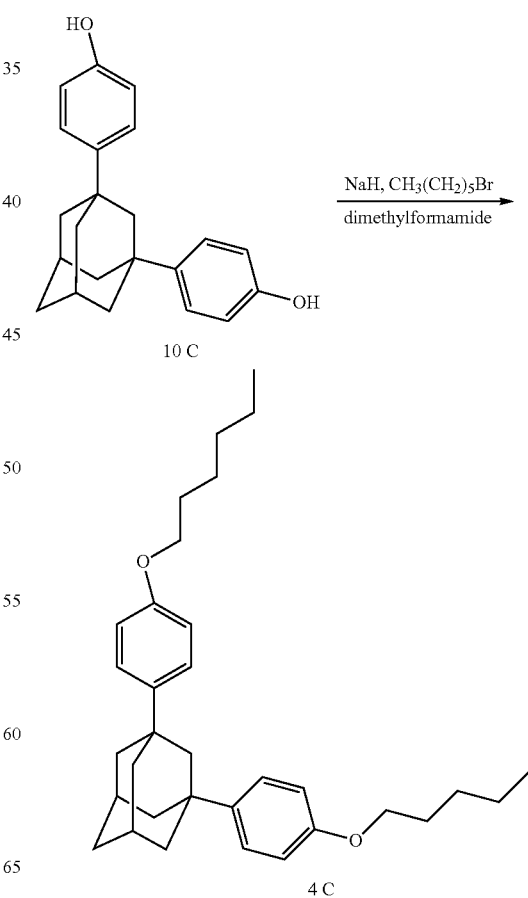

[Formula 22]

1,3-Bis(4-hydroxyphenyl)adamantane (Compound 10C) (88.4 mg, 0.275 mmol, 1.0 eq.) and a spinner were put into a 10-ml pear-shaped flask, and the system was purged with nitrogen. To this was added DMF (1.0 ml), and the system was cooled to 0° C. in an ice bath.(*1)

Sodium hydride (29.6 mg, 0.721 mmol, 2.6 eq.) and a spinner were put into a 10-ml two-necked eggplant flask, and the system was purged with nitrogen. To this was added DMF (2.5 ml), and the system was cooled at 0° C. in an ice bath; and the above (*1) was added dropwise thereto (4 drops/sec) through a cannula. The system was stirred for 30 minutes while kept at 0° C., and 1-bromohexane (0.11 ml, 0.786 mmol, 2.8 eq.) was added thereto, and stirred for 12 hours with restoring to room temperature, then the system was kept at 50° C. in an oil bath and stirred for 3 hours. Subsequently, this was further stirred at 70° C. for 2 hours. This was then left as such until the system reached room temperature, water was added thereto, and this was extracted three times with chloroform, the collected organic layer was washed with water and saturated saline water, and dried over anhydrous sodium sulfate. The desiccant agent was removed through filtration, the solvent was evaporated away under reduced pressure, and the residue was purified through flash column chromatography (developing solvent: 5% ethyl acetate/hexane) to give a white powder of 1,3-bis(4-hexyloxyphenyl)adamantane (compound 4C).

Amount obtained: 98.3 mg (0.201 mmol)

Chemical Yield: 73.1% (based on compound 10C.)

$^1$H NMR: 0.89 (6H, t, J/Hz=7.0), 1.33 (8H, m), 1.44 (4H, m), 1.76 (6H, m, J/Hz=6.8, methylene), 1.76 (2H, br. s, adamantane), 1.91 (8H, br. s), 1.98 (2H, br. s), 2.28 (2H, br. s), 3.93 (4H, t, J/Hz=6.6), 6.85 (4H, d (AA'BB'), J/Hz=8.9), 7.29 (4H, d (AA'BB'), J/Hz=8.9)

IR: 3051 (w), 3038 (w), 2934 (s), 2925 (s), 2917 (s), 2850 (s), 1607 (m), 1577 (w), 1510 (s), 1473 (m), 1451 (w), 1392 (w), 1292 (w), 1245 (s), 1182 (s), 1127 (w), 1111 (w), 1058 (w), 1026 (m), 1007 (w), 995 (w), 825 (m), 802 (m), 730 (w), 612 (w), 551 (m).

LRMS: 489 ((M+1)$^+$, 54), 488 ((M$^+$, 100), 404 ((M-C$_6$H$_{12}$)$^+$, 14), 320 ((M-C$_{12}$H$_{24}$)$^+$, 3.3).

Example 9

Synthesis of 4,9-bis{4-(1-heptynyl)phenyl}diamantane (Compound 5)

4,9-Bis(4-iodophenyl)diamantane (compound 3) (399.9 mg. 0.675 mmol, 1.0 eq.), copper(I) iodide (17.6 mg, 0.09 mmol, 0.13 eq.), and a spinner were put into a 300-ml round-bottom Schlenk flask, then a Y-shaped tube, a reflux condenser and a balloon were equipped thereto, and the system was purged with nitrogen. With nitrogen kept introduced into the system, bis(triphenylphosphine)palladium(II) (40.3 mg, 0.056 mmol, 0.08 eq.) was added thereto from the top of the Y-shaped tube, and piperidine (60 ml) was added thereto and heated. When the system began to reflux and 4,9-(4-iodophenyl)diamantane (compound 3) dissolved therein, 1-heptyne (0.2 ml, 1.53 mmol, 2.2 eq.) was added thereto through a syringe, and refluxed for 1 hour. The solution was cooled to room temperature, and aqueous 0.5 M ammonium chloride solution and chloroform were added thereto, the aqueous layer was extracted three times with chloroform, the collected organic layer was washed with water and saturated saline water, and dried over anhydrous sodium sulfate. The desiccant agent was removed through filtration, the solvent was evaporated away under reduced pressure, and the residue was purified through flash column chromatography (developing solvent: 15% benzene/hexane) to give a white powder (251.2 mg). This was recrystallized from a mixed solvent of chloroform/hexane to give a white acicular crystal of 4,9-bis{4-(1-heptynyl)phenyl}diamantane (compound 5).

Amount obtained: 237.0 mg (0.448 mmol)

Chemical Yield: 66.4% (based on compound 3.)

$^1$H NMR: 0.92 (6H, t, J/Hz=7.0), 1.31-1.45 (8H, m), 1.59 (4H, m), 1.94 (18H, br. s), 2.39 (4H, t, J/Hz=7.2), 7.31 (4H, d (AA'BB'), J/Hz=8.7 Hz), 7.36 (4H, d (AA'BB'), J/Hz=8.7 Hz)

IR: 3081 (w), 3031 (w), 2952 (m), 2914 (m), 2883 (m), 2848 (m), 1509 (m), 1458 (m), 1439 (m), 1404 (w), 1349 (w), 1301 (w), 1286 (w), 1268 (m), 1114 (w), 1075 (m), 1049 (m), 1017 (w), 985 (m), 831 (s), 798 (m), 727 (w), 551 (s).

LRMS: 530 ((M+1)$^+$, 73), 529 ((M$^+$, 72), 357 ((M-C$_{13}$H$_{14}$)$^+$. 100), 185 ((M-C$_{26}$H$_{28}$)$^+$, 18).

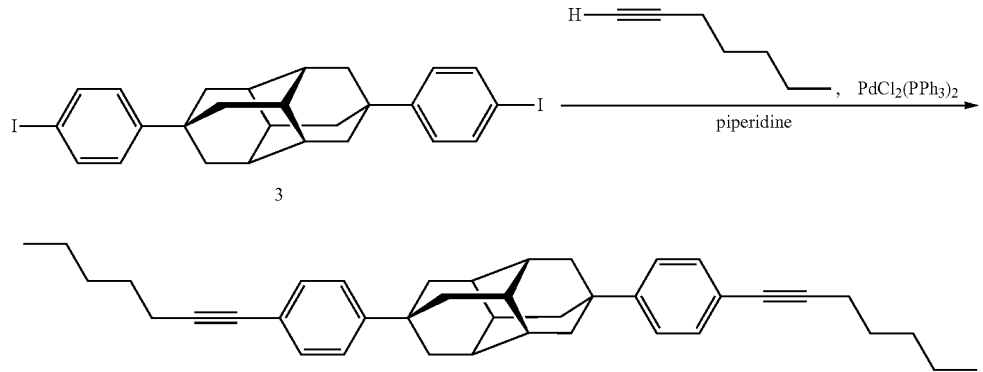

[Formula 23]

Example 10

Synthesis of 4,9-bis(4-heptylphenyl)diamantane (Compound 6)

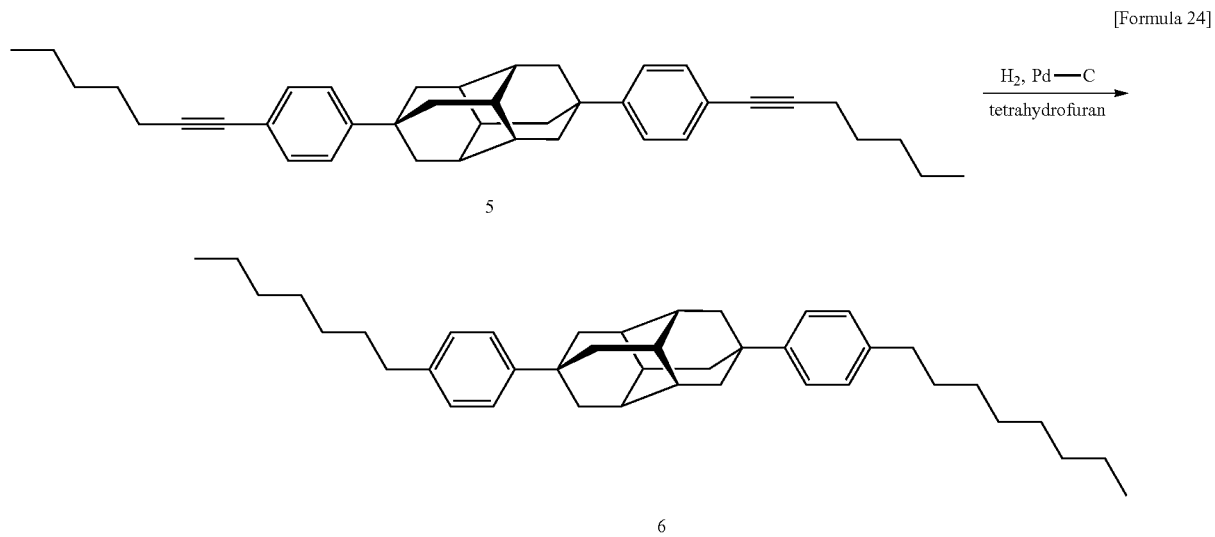

[Formula 24]

4,9-Bis{4-(1-heptynyl)phenyl}diamantane (compound 5) (41.8 mg, 0.0790 mmol, 1.0 eq.), 10% palladium-active carbon (9.6 mg, 0.166 mmol, 0.45 eq.), tetrahydrofuran (hereinafter "THF") (2 ml), and a spinner were put into a 30-ml two-necked eggplant flask, and the system was purged with hydrogen. This was stirred at room temperature for 9 hours, and 10% palladium-active carbon was removed through filtration. The solvent was evaporated away under reduced pressure, then the residue was purified through flash column chromatography (developing solvent: 5% chloroform/hexane), and the resulting white powder (42.1 mg) was recrystallized from a mixed solvent of chloroform/methanol to give a white flaky crystal of 4,9-bis(4-heptylphenyl)diamantane (compound 6).

Amount obtained: 37.5 mg (0.0689 mmol)
Chemical Yield: 88.4% (based on compound 5.)
$^1$H NMR: 0.87 (6H, t, J/Hz=6.8), 1.25-1.33 (16H, m), 1.55-1.63 (4H, m), 1.95 (18H, br. s), 2.57 (4H, t, J/Hz=7.9), 7.15 (4H, d (AA'BB'), J/Hz=8.3 Hz), 7.32 (4H, d (AA'BB'), J/Hz=8.3 Hz)

IR: 3085 (w), 3045 (w), 3015 (w), 2999 (w), 2915 (s), 2884 (s), 2849 (s), 1513 (m), 1464 (m), 1439 (w), 1412 (w), 1378 (w), 1271 (w), 1249 (w), 1123 (w), 1075 (w), 1049 (w), 1017 (w), 985 (w), 834 (m), 814 (w), 794 (m), 723 (w), 650 (w), 616 (w), 542 (m).

LRMS: 536 (M$^+$, 100), 450 ((M—C$_6$H$_6$)$^+$, 37), 361 ((M—C$_{13}$H$_{19}$)$^+$, 12), 183 ((M-C$_{26}$H$_{41}$)$^+$, 15).

Example 11

Synthesis of 4,9-bis(4-pentyloxycarbonylphenyl)diamantane (Compound 9)

Synthesis of 4,9-bis{4-(1,2-dioxoheptyl)phenyl}diamantane (Compound 7)

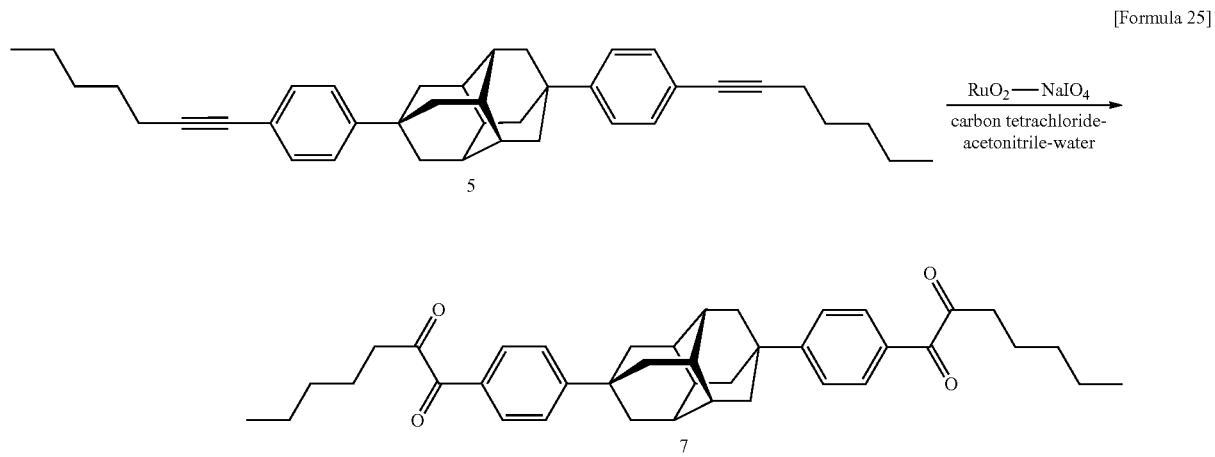

[Formula 25]

4,9-Bis{4-(1-heptynyl)phenyl}diamantane (compound 5) (57.7 mg, 0.109 mmol, 1.0 eq.), sodium periodate (99.7 mg, 0.466 mmol, 4.3 eq.), a spinner, carbon tetrachloride (4.5 ml), acetonitrile (4.5 ml) and water (6 ml) were put into a 30-ml two-necked eggplant flask, and stirred until the solid wholly dissolved. To this was added ruthenium dioxide monohydrate (0.6 mg, 0.0045 mmol, 0.04 eq.), and stirred for minutes. After the reaction, the suspension was transferred into a 100-ml separatory funnel, and the aqueous phase was extracted twice with dichloromethane. The precipitate contained in the collected organic layer was removed through filtration; the filtrate was washed with water and saturated saline water, and dried over anhydrous sodium sulfate. The desiccant agent was removed through filtration, and the solvent was evaporated away under reduced pressure to give a pale yellow powder of the compound 7.

Amount obtained: 50.6 mg (0.0845 mmol)

Chemical Yield: 78.4% (based on compound 5.)

$^1$H NMR (300 MHz, CDCl$_3$, TMS): δ/ppm, 0.91 (6H, t, J/Hz=7.1), 1.33-1.40 (8H, m), 1.65-1.75 (4H, m), 1.99 (18H, br. s), 2.87 (4H, t, J/Hz=7.3), 7.53 (4H, d (AA'BB'), J/Hz=8.9 Hz), 7.95 (4H, d (AA'BB'), J/Hz=8.7 Hz)

IR: 2957 (m), 2914 (m), 2885 (m), 2850 (m), 1776, (m), 1667 (s), 1604 (m), 1567 (w), 1512 (w), 1459 (m), 1439 (m), 1409 (m), 1283 (m), 1188 (m), 1122 (m), 1075 (m), 1049 (m), 986 (m), 954 (m), 938 (m), 850 (m), 841 (m), 827 (m), 813 (m), 798 (m), 774 (m), 706 (m), 542 (m), 530 (m).

LRMS: 592 (M$^+$, 8.9).

Melting Point: >360° C. (immeasurable as it exceeded the detection limit of the melting point measuring apparatus.)

Synthesis of 4,9-bis(4-carboxyphenyl)diamantane (Compound 8)

[Formula 26]

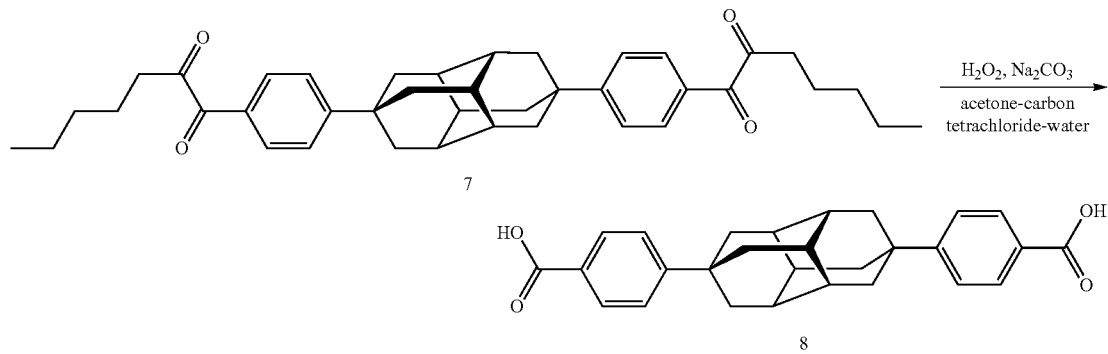

Compound 7 (50.6 mg, 0.0854 mmol, 1.0 eq.), sodium carbonate (77.5 mg. 0.735 mmol, 8.5 eq.), a spinner, acetone (15 ml), chloroform (2 ml) and water (10 ml) were put into a 50-ml two-necked eggplant flask, and stirred until the solid wholly dissolved. Subsequently, 30% aqueous hydrogen peroxide (0.1 ml, 0.882 mmol, 10 eq.) was added thereto and stirred for 3 hours. To this was added chloroform, and the organic phase was extracted with aqueous 50% potassium hydroxide solution. Aqueous 3 mol/L hydrochloric acid was added to the collected aqueous phase until its pH could be from 1 to 2, and this was extracted three times with ethyl acetate. The collected organic phase was washed with water and saturated saline water, and dried over anhydrous sodium sulfate. The desiccant agent was removed through filtration, and the solvent was evaporated away under reduced pressure to give a white powder of the compound 8.

Amount obtained: 42.2 mg (0.100 mmol)

Chemical Yield: quantitative (based on compound 7.)

IR: 2915 (s), 2888 (s), 2664 (m), 1677 (s), 1607 (m), 1569 (w), 1457 (w), 1419 (m), 1283 (m), 1189 (m), 931 (w), 852 (w), 773 (w), 706 (w), 547 (w), 526 (w).

Synthesis of 4,9-bis(4-pentyloxycarbonylphenyl)diamantane (Compound 9)

[Formula 27]

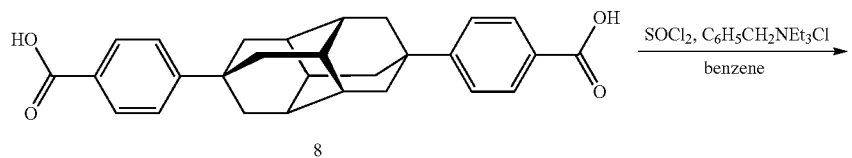

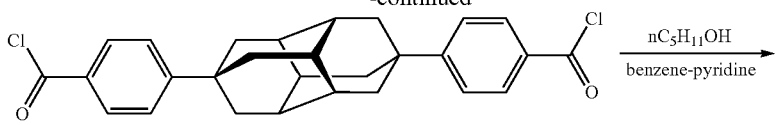

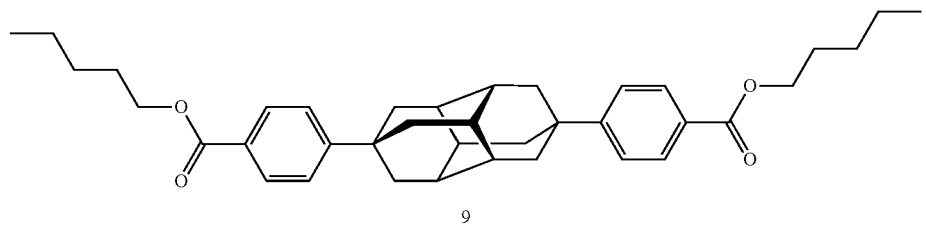

9

The crude compound 8 (34.9 mg, 0.0815 mmol, 1.0 eq.), benzyltriethylammonium chloride (0.5 mg, 0.002 mmol, 0.03 eq.), and a spinner were put into a 30-ml two-necked flask, and the system was purged with nitrogen. Benzene (1.5 ml) was added thereto and heating was started. When a mild reflux began, thionyl chloride (1.3 ml, excess) was added thereto, and mildly refluxed for 7 hours. After the reaction, the solution was cooled to room temperature, and an ordinary pressure distillation unit (T-shaped tube, a Liebig condenser, two three-necked 30-ml eggplant flasks) was equipped thereto; and thionyl chloride and benzene were evaporated away through ordinary pressure distillation (however, a small amount of benzene and thionyl chloride remained). Not further purified, the resulting reddish brown residue was used in the next reaction.

A septum was fitted to a 50-ml eggplant flask, and the system was purged with nitrogen. Benzene (1 ml), 1-pentanol (0.5 ml, excess) and pyridine (0.1 ml) were added thereto and stirred.(*2)

A reflux condenser and a balloon were equipped to the 30-ml flask containing the crude acid chloride therein, and the solution (*2) was added dropwise thereto through a cannula (2 to 3 drops/sec—the addition was followed by washing with 1 ml of benzene). After the addition, this was gently refluxed for 1.5 hours. After the reaction, the solution was cooled to room temperature, water was added thereto, the aqueous phase was extracted three times with ethyl acetate, the collected organic layer was washed with water and saturated saline water, and dried over anhydrous sodium sulfate. The desiccant agent was removed through filtration, the solvent was evaporated away under reduced pressure, and the residue was purified through flash column chromatography (developing solvent: 2% ethyl acetate/hexane) to give a white powder (22.9 mg). This was recrystallized from a mixed solvent of methanol/hexane to give a white flaky crystal of 4,9-bis(4-pentyloxycarbonylphenyl)diamantane (compound 9).

Amount obtained: 16.6 mg (0.0292 mmol)
Chemical Yield: 35.8% (based on compound 8.)
$^1$H NMR: 0.93 (6H, t, J/Hz=7.0), 1.37-1.47 (8H, m), 1.76 (4H, quintet, J/Hz=7.2), 1.94 (18H, br. s), 4.31 (4H, t, J/Hz=6.6), 7.48 (4H, d (AA'BB'), J/Hz=8.7 Hz), 8.01 (4H, d (AA'BB'), J/Hz=8.7 Hz)

IR: 3053 (w), 2954 (m), 2915 (m), 2852 (m), 1712 (s), 1607 (m), 1459 (w), 1408 (w), 1274 (s), 1187 (m), 1105 (s), 1050 (w), 1016 (m), 962 (m), 850 (m), 706 (m), 531 (w).

LRMS: 568 ((M$^+$, 8.1), 498 ((M-C$_5$H$_{10}$)$^+$, 25), 481 ((M-C$_5$H$_{11}$O)$^+$, 19), 427 ((M-C$_{10}$H$_{21}$)$^+$, 100), 411 ((M-C$_{10}$H$_{21}$O)$^+$, 9).

Example 12

Synthesis of 4,9-bis(4-hexanoyloxyphenyl)diamantane (Compound 11)

Synthesis of 4,9-bis(4-hydroxyphenyl)diamantane (Compound 10)

[Formula 28]

4-5

10

4,9-Bis(4-pentyloxyphenyl)diamantane (compound (4-5)) (60.2 mg, 0.117 mmol, 1.0 eq.) and a spinner were put into a 20-ml two-necked eggplant flask, the system was purged with nitrogen, and dichloromethane (5 ml) was added thereto through a syringe. The flask was cooled at 0° C., and 1.0 mol/L boron tribromide/dichloromethane solution (0.25 ml, 0.25 mmol, 2.1 eq.) was added thereto through a syringe, and stirred for 13.5 hours with gradually restoring from 0° C. to room temperature. Water was added to the reaction system, ethyl acetate was added thereto for liquid-liquid separation, and the aqueous layer was extracted three times with ethyl acetate. The collected organic layer was washed with saturated saline water, and dried over anhydrous sodium sulfate. The desiccant agent was removed through filtration, the solvent was evaporated away under reduced pressure, the residue was purified through flash column chromatography (developing solvent: 20% ethyl acetate/hexane→40% ethyl acetate/hexane), and the resulting white powder (40.7 mg) was reprecipitated using ethyl acetate as a good solvent and hexane as a poor solvent to give a white powder of 4,9-bis(4-hydroxyphenyl)diamantane (compound 10).

Amount obtained: 36.4 mg (0.0977 mmol)
Chemical Yield: 83.5% (based on compound (4-5).)
$^1$H NMR (300 MHz, CD$_3$C(=O)CD$_3$, TMS): δ/ppm, 1.93 (12H, br. s), 1.93 (6H, br. s), 6.78 (4H, d (AA'BB'), J/Hz=8.9 Hz), 7.25 (4H, d (AA'BB'), J/Hz=8.9 Hz), 8.10 (1H, s)
IR: 3595 (s), 3380 (br. s), 3251 (br. s), 3023 (m), 2910 (s), 2883 (s), 2847 (m), 1613 (m), 1596 (m), 1513 (s), 1452 (m), 1378 (m), 1247 (s), 1181 (m), 1048 (w), 1013 (w), 986 (w), 826 (m), 797 (m), 581 (m), 537 (m).
LRMS: 373 ((M+1)$^+$, 31), 372 (M$^+$, 100), 186 ((M-C$_{12}$H$_{10}$O$_2$)$^+$, 8).
Melting Point: 355.0-356.0° C.

Synthesis of
4,9-bis(4-hexanoyloxyphenyl)diamantane
(Compound 11)

reached room temperature, water was added thereto to quench the reaction, and the solvent was evaporated away under reduced pressure. Chloroform was added thereto, and this was washed with aqueous saturated sodium carbonate solution, water and saturated saline water in this order, and dried over anhydrous sodium sulfate. The desiccant agent was removed through filtration, the solvent was evaporated away under reduced pressure, the residue was purified through flash column chromatography (developing solvent: 5% ethyl acetate/hexane), and the resulting white powder (26.2 mg) was recrystallized from a mixed solvent of chloroform/methanol to give a white acicular crystal of 4,9-bis(4-hexanoyloxyphenyl)diamantane (compound 11).

Amount obtained: 17.7 mg (0.0311 mmol)
Chemical Yield: 41.7% (based on compound 10.)
$^1$H NMR: 0.93 (6H, t, J/Hz=7.0), 1.37-1.42 (8H, m), 1.73-1.81 (4H, m), 1.95 (18H, br. s), 2.55 (4H, t, J/Hz=7.3), 7.03 (4H, d (AA'BB'), J/Hz=8.9 Hz), 7.40 (4H, d (AA'BB'), J/Hz=8.7 Hz)
IR: 3036 (w), 2954 (m), 2910 (s), 2880 (s), 2870 (s), 2849 (s), 1753 (s), 1505 (m), 1460 (w), 1439 (w), 1415 (w), 1376 (w), 1317 (w), 1247 (w), 1205 (m), 1169 (m), 1141 (m), 1109 (m), 1074 (w), 1014 (w), 984 (w), 837 (m), 796 (w), 540 (w).
LRMS: 568 (M$^+$, 3), 470 ((M-C$_6$H$_{10}$O)$^+$, 18), 372 ((M-C$_{12}$H$_{20}$O$_2$)$^+$, 100).

The phase transition temperatures of the compounds obtained in Examples 1 to 12 are shown in Table 1.

In Table 1, Cry, Sm, Nm and Is mean a crystal phase, a smectic phase, a nematic phase and an isotropic phase, respectively.

"*" means the existence of the marked phase for the compound. The arrow "→" means phase transition from the left side phase of the arrow to the right side phase thereof; the arrow "←" means phase transition from the right side phase of the arrow to the left side phase thereof; and the numerical value is the transition temperature (° C.).

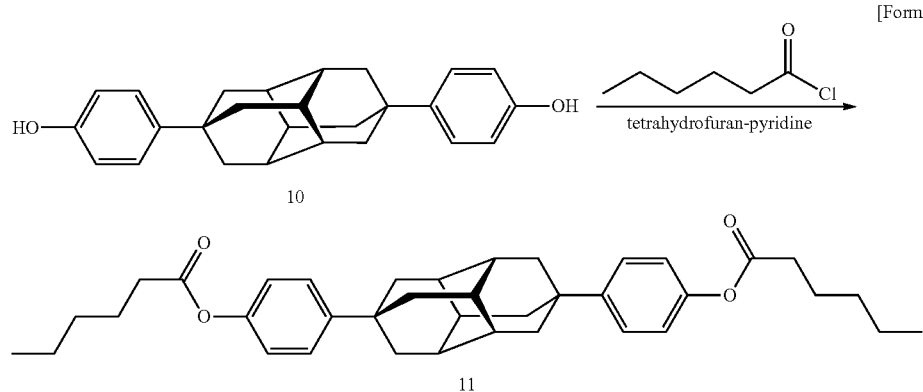

[Formula 29]

4,9-Bis(4-hydroxyphenyl)diamantane (compound 10) (27.8 mg, 0.746 mmol, 1.0 eq.) and a spinner were put into a 30-ml two-necked eggplant flask, the system was purged with nitrogen, and THF (3.0 ml) and pyridine (0.5 ml) were added thereto through a syringe. The flask was cooled at 0° C., and hexanoyl chloride (0.05 ml, 0.36 mmol, 5.0 eq.) was added thereto through a syringe. The reaction suspension was stirred for 3 hours with gradually restoring from 0° C. to room temperature, and subsequently, THF (8.0 ml) and pyridine (3.5 ml) were added thereto through a syringe, and mildly refluxed for 5 hours. After left as such until the system Some compounds may have a plurality of smectic phases; and as for these, the transition temperature from the crystal phase to the smectic phase and the transition temperature from the smectic phase to the nematic phase or to the isotropic phase are shown in the heating process, while in the cooling process, the transition temperature from the isotropic phase or the nematic phase to the smectic phase and the transition temperature from the smectic phase to the crystal phase are shown. Some compounds may have a glass phase.

From the results in Table 1, it is shown that, of those represented by the general formula (IV): 4,9-bis(4-alkoxyphenyl)diamantanes, the compound where the alkyl group is a methyl group (compound (4-1)) exhibited a nematic phase alone, but in the others where the alkyl group has two or more carbon atoms (compound (4-2) to compound (4-8)), a smectic phase appeared, and their smectic nature was enhanced when the number of carbon atoms in the compounds is increased. This is considered because the van der Waals force of the alkyl chain in the compounds would increase with the increase in the carbon number thereof, and the intermolecular interaction would be thereby increased.

It is obvious that the compounds of the general formula (IV): 4,9-bis(4-alkoxyphenyl)diamantanes have a smectic phase and a nematic phase, and they show an extremely high uppermost temperature of the nematic phase. Those in which the alkyl group has 8 or 10 carbon atoms do not have a nematic phase, but the uppermost temperature of the nematic phase thereof is over 200° C.

Both the phase transition temperature measurements and the polarization microscopy observations confirmed that 1,3-bis(4-hexyloxyphenyl)adamantane (compound 4C) having adamantane in place of diamantane does not have liquid crystallinity. This is considered because the bent structure of the compound would interfere with the occurrence of a liquid crystal phase.

It can be seen that the compound of the general formula (Vb) shows only a smectic phase; the compound of the general formula (Vc) shows only a nematic phase; and the compound 5 and the compound 11 of the general formulae (Va) and (Vd), respectively, show both a smectic phase and a nematic phase.

FIG. 1 shows the optical textures of the compound 5 obtained in Example 9, 4,9-bis{4-(1-heptynyl)phenyl}diamantane as observed with a polarization microscope in the heating and cooling processes thereof.

(1) Heating Process (185.5° C. to 288.1° C.). Refer to FIG. 1(b), (c) and (d).

When the compound having a crystal phase (FIG. 1(a)) was heated, then it began to melt at around 185° C., and showed a complicated optical texture as in FIG. 1(b). When further heated, its fluidity increased at around 210° C., and the compound partially showed a fan-shaped texture as in FIG. 1(c). This texture characterizes a smectic phase. At around 230° C., the compound changed to have a homeotropic alignment as in FIG. 1(d).

(2) Heating Process (288.1° C. to 309.2° C.). Refer to FIG. 1(e).

When further heated, the compound began to show a Schlieren texture characterizing a nematic phase as in FIG. 1(c). When heated at 309.2° C. or higher, the view of the microscope became a dark field, therefore it is considered that the compound would have an isotropic phase.

(3) Cooling Process (284.9° C. to 244.2° C.). Refer to FIG. (f).

When the isotropic liquid was cooled, then it showed a texture with globules, as in FIG. 1(f). As being a liquid crystal phase on a higher temperature side than the smectic phase, this was identified as a nematic phase. The temperature in this state is taken as a phase transition temperature of nematic phase/isotropic phase transition.

| (Heating Process) | | | | | | | | | | | | | |
|---|---|---|---|---|---|---|---|---|---|---|---|---|---|
| Diamantane Compound | | | | | Phase Transition Temperature | | | | | | | | |
| General Formula | Compound | $R^5$ and $R^6$ | $R^7$ and $R^8$ | $X^1$ and $X^2$ | G | G→Cry | Cry | Cry→Sm | Cry→Nm | Sm | Sm→Nm | Sm→Is | Nm | Nm→Is | Is |
| (IV) | 4-1 | methyl | — | — | — | — | * | — | 279.5 | — | — | — | * | 345.5 | * |
| (IV) | 4-2 | ethyl | — | — | * | 138.4 | * | 217.7 | — | * | 226.0 | — | * | 342.2 | * |
| (IV) | 4-3 | n-propyl | — | — | — | — | * | 154.8 | — | * | 198.8 | — | * | 310.0 | * |
| (IV) | 4-4 | n-butyl | — | — | — | — | * | 133.3 | — | * | 172.3 | — | * | 296.1 | * |
| (IV) | 4-5 | n-pentyl | — | — | — | — | * | 94.4 | — | * | 222.2 | — | * | 279.6 | * |
| (IV) | 4-6 | n-hexyl | — | — | — | — | * | 113.8 | — | * | 239.8 | — | * | 265.7 | * |
| (IV) | 4-7 | n-octyl | — | — | — | — | * | 125.3 | — | * | — | 238.2 | — | — | * |
| (IV) | 4-8 | n-decyl | — | — | — | — | * | 124.3 | — | * | — | 221.8 | — | — | * |
| (Va) | 5 | — | n-pentyl | —C≡C— | — | — | * | 185.5 | — | * | 288.1 | — | * | 309.2 | * |
| (Vb) | 6 | — | n-pentyl | —CH$_2$CH$_2$— | * | 49.8 | * | 89.0 | — | * | — | — | — | 206.4 | * |
| (Vc) | 9 | — | n-pentyl | oxycarbonyl | — | — | * | — | 212.1 | — | — | — | * | 244.5 | * |
| (Vd) | 11 | — | n-pentyl | carbonyloxy | — | — | * | 115.2 | — | * | 283.5 | — | * | 326.6 | * |

| (Cooling Process) | | | | | | | | | | | | | |
|---|---|---|---|---|---|---|---|---|---|---|---|---|---|
| Diamantane Compound | | | | | Phase Transition Temperature | | | | | | | | |
| General Formula | Compound | $R^5$ and $R^6$ | $R^7$ and $R^8$ | $X^1$ and $X^2$ | G | G←Nm/Sm | Cry | Cry←Sm | Cry←Nm | Sm | Sm←Nm | Sm←Is | Nm | Nm←Is | Is |
| (IV) | 4-1 | methyl | — | — | — | — | * | — | 274.5 | — | — | — | * | >326.1[#] | * |
| (IV) | 4-2 | ethyl | — | — | * | 216.8 | * | — | — | — | — | — | * | >336.2[#] | * |
| (IV) | 4-3 | n-propyl | — | — | — | — | * | 127.5 | — | * | 192.3 | — | * | 304.9 | * |
| (IV) | 4-4 | n-butyl | — | — | — | — | * | 122.6 | — | * | 164.7 | — | * | 292.7 | * |
| (IV) | 4-5 | n-pentyl | — | — | — | — | * | 70.9 | — | * | 211.4 | — | * | 276.4 | * |
| (IV) | 4-6 | n-hexyl | — | — | — | — | * | 82.8 | — | * | 232.8 | — | * | 262.5 | * |
| (IV) | 4-7 | n-octyl | — | — | — | — | * | 74.4 | — | * | — | 233.7 | — | — | * |
| (IV) | 4-8 | n-decyl | — | — | — | — | * | 116.8 | — | * | — | 218.0 | — | — | * |
| (Va) | 5 | — | n-pentyl | —C≡C— | — | — | * | 100.5 | — | * | >244.2[#] | — | * | >284.9[#] | * |
| (Vb) | 6 | — | n-pentyl | —CH$_2$CH$_2$— | * | 100.1 | — | — | — | * | — | 203.5 | — | — | * |
| (Vc) | 9 | — | n-pentyl | carbonyloxy | — | — | * | — | 206.9 | — | — | — | * | 241.9 | * |
| (Vd) | 11 | — | n-pentyl | oxycarbonyl | — | — | * | 90.5 | — | * | 266.2 | — | * | 320.5 | * |

[#]Data found in polarization microscopy. At the indicated temperature, the phase change has finished.

(4) Cooling process (244.2° C. to 100.5° C.). Refer to FIG. 1(g), (i) and (j).

When the compound in a nematic phase was cooled on, it began to show a short rod-like texture at 244.2° C., and immediately the texture changed to a fan-shaped texture as in FIG. 1(g); and at around 200° C., the fan-shaped texture of FIG. 1(g) changed to a mosaic texture as in FIG. 1(h). At a different site of the same sample being analyzed, a fan-shaped texture with no definite boundaries was seen as in FIG. 1(i). This would be a transition texture from the unstable fan-shaped texture to the mosaic texture. When further cooled from this state, the compound showed a polygonal texture at around 135° C., as in FIG. 1(j); and with this texture as such, the compound changed to a crystal phase (FIG. 1(k)).

The invention claimed is:

1. A diamantane compound represented by a general formula (III):

[Formula 3]

(III)

wherein $R^3$ and $R^4$ are each an alkyl group having from 1 to 12 carbon atoms, an alkoxy group having from 2 to 12 carbon atoms, an alkynyl group having from 2 to 12 carbon atoms, an alkoxycarbonyl group having from 2 to 12 carbon atoms, or an alkyloyloxy group having from 2 to 12 carbon atoms; and part of the hydrogen atoms of these groups may be replaced by a halogen atom or a heteroatom-containing group, said heteroatom belonging to a group 14-16 of the Periodic Table.

2. The diamantane compound as claimed in claim 1, represented by a general formula (IV):

[Formula 4]

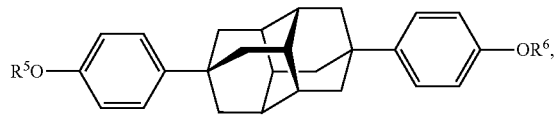

(IV)

wherein $R^5$ and $R^6$ are each an unsubstituted alkyl group having from 1 to 10 carbon atoms.

3. The diamantane compound as claimed in claim 1, represented by a general formula (V):

[Formula 5]

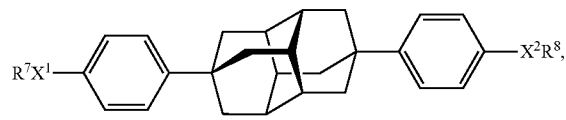

(V)

wherein $R^7$ and $R^8$ are each an unsubstituted n-pentyl group; and $X^1$ and $X^2$ are each —CH$_2$CH$_2$—, —C≡C— or —COO—.

4. A liquid crystalline compound represented by a general formula (III):

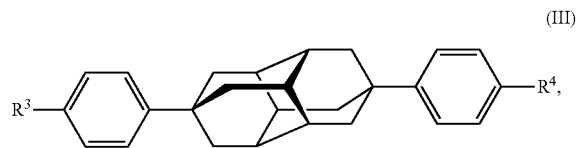

(III)

wherein $R^3$ and $R^4$ are each an alkyl group having from 1 to 12 carbon atoms, an alkoxy group having from 1 to 12 carbon atoms, an alkynyl group having from 2 to 12 carbon atoms, an alkoxycarbonyl group having from 2 to 12 carbon atoms, or an alkyloyloxy group having from 2 to 12 carbon atoms; and part of the hydrogen atoms of these groups may be replaced by a halogen atom or a heteroatom-containing group, said heteroatom belonging to a group 14-16 of the Periodic Table.

5. A liquid crystalline composition comprising the liquid crystalline compound as claimed in claim 4.

6. A liquid crystal display device comprising the liquid crystalline composition as claimed in claim 5.

7. A liquid crystalline compound represented by a general formula (IV):

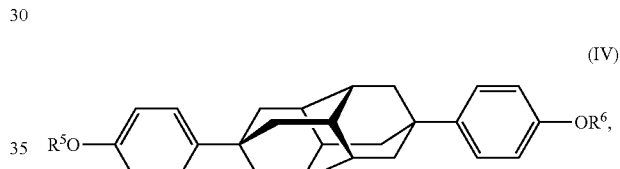

(IV)

wherein $R^5$ and $R^6$ are each an unsubstituted alkyl group having from 1 to 10 carbon atoms.

8. A liquid crystalline composition comprising the liquid crystalline compound as claimed in claim 7.

9. A liquid crystal display device comprising the liquid crystalline composition as claimed in claim 8.

10. A liquid crystalline compound represented by a general formula (V):

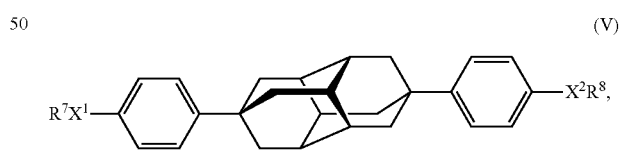

(V)

wherein $R^7$ and $R^8$ are each an unsubstituted n-pentyl group; and $X^1$ and $X^2$ are each —CH$_2$CH$_2$—, —C≡C— or —COO—.

11. A liquid crystalline composition comprising the liquid crystalline compound as claimed in claim 10.

12. A liquid crystal display device comprising the liquid crystalline composition as claimed in claim 11.

* * * * *

UNITED STATES PATENT AND TRADEMARK OFFICE
CERTIFICATE OF CORRECTION

PATENT NO. : 8,614,348 B2
APPLICATION NO. : 12/922285
DATED : December 24, 2013
INVENTOR(S) : Yokoyama et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this
Twenty-second Day of September, 2015

Michelle K. Lee
*Director of the United States Patent and Trademark Office*